(12) United States Patent
Altaras et al.

(10) Patent No.: US 11,296,744 B2
(45) Date of Patent: Apr. 5, 2022

(54) FOLDABLE PHONE CASE METHOD AND DEVICES

(71) Applicants: Eli Altaras, Irvine, CA (US); Yusuf Altaras, Irvine, CA (US)

(72) Inventors: Eli Altaras, Irvine, CA (US); Yusuf Altaras, Irvine, CA (US)

( * ) Notice: Subject to any disclaimer, the term of this patent is extended or adjusted under 35 U.S.C. 154(b) by 0 days.

(21) Appl. No.: 17/202,290

(22) Filed: Mar. 15, 2021

(65) Prior Publication Data

US 2021/0273672 A1 Sep. 2, 2021

Related U.S. Application Data

(63) Continuation of application No. 16/803,988, filed on Feb. 27, 2020, now Pat. No. 10,951,254.

(51) Int. Cl.
| | |
|---|---|
| *H04B 1/3888* | (2015.01) |
| *A45C 11/00* | (2006.01) |
| *H04M 1/04* | (2006.01) |
| *H04M 1/02* | (2006.01) |
| *H04W 4/80* | (2018.01) |

(52) U.S. Cl.
CPC ............ *H04B 1/3888* (2013.01); *A45C 11/00* (2013.01); *H04M 1/0212* (2013.01); *H04M 1/04* (2013.01); *H04W 4/80* (2018.02); *A45C 2011/002* (2013.01)

(58) Field of Classification Search
CPC .... H04B 1/3888; H04M 1/04; H04M 1/0212; H04W 4/80; A45C 11/00; A45C 2011/002
See application file for complete search history.

(56) References Cited

U.S. PATENT DOCUMENTS

| | | | | |
|---|---|---|---|---|
| 7,283,847 | B2 * | 10/2007 | Kim | H04M 1/0247 |
| | | | | 455/550.1 |
| 9,235,239 | B2 * | 1/2016 | van Dijk | H04M 1/022 |
| 9,382,752 | B1 * | 7/2016 | Zubay | E06B 9/17076 |
| 10,491,725 | B1 * | 11/2019 | Harmon | H04M 1/022 |
| D879,764 | S  * | 3/2020 | Lee | D14/250 |
| 10,601,967 | B1 * | 3/2020 | Harmon | H04M 1/022 |
| 2008/0096620 | A1 * | 4/2008 | Lee | G06F 1/1686 |
| | | | | 455/575.8 |
| 2012/0264489 | A1 * | 10/2012 | Choi | H04M 1/0268 |
| | | | | 455/566 |
| 2013/0037228 | A1 * | 2/2013 | Verschoor | G06F 1/1652 |
| | | | | 160/377 |
| 2013/0149964 | A1 * | 6/2013 | Kreiner | H04B 5/0062 |
| | | | | 455/41.2 |

(Continued)

*Primary Examiner* — Lewis G West
(74) *Attorney, Agent, or Firm* — Edmond DeFrank

(57) ABSTRACT

The embodiments disclose a method including fabricating a one section foldable phone case for coupling with a foldable phone configured to fold from top to bottom, fabricating a one section foldable phone case for coupling with a foldable phone configured to fold from side to side, fabricating a two-section foldable phone case for coupling with a foldable phone configured to fold from top to bottom, fabricating a two-section foldable phone case for coupling with a foldable phone configured to fold from side to side, wherein phone cases are configured to view front and back foldable phone folded and unfolded screens, and embedding a RFID chip with a unique ID number into a foldable phone cases configured for locating and identifying a user's foldable phone case.

19 Claims, 21 Drawing Sheets

(56) References Cited

U.S. PATENT DOCUMENTS

| | | | | |
|---|---|---|---|---|
| 2013/0300679 A1* | 11/2013 | Oh | ................... | G06F 1/1677 |
| | | | | 345/173 |
| 2013/0342094 A1* | 12/2013 | Walters | ............... | G06F 1/1615 |
| | | | | 312/319.2 |
| 2014/0042293 A1* | 2/2014 | Mok | ................. | G06F 1/1652 |
| | | | | 248/682 |
| 2015/0009077 A1* | 1/2015 | Lee | ................. | H01Q 1/243 |
| | | | | 343/702 |
| 2015/0156297 A1* | 6/2015 | Crawford | ............... | H04M 1/21 |
| | | | | 455/26.1 |
| 2017/0099072 A1* | 4/2017 | Moon | ............... | H04B 1/3888 |
| 2017/0127780 A1* | 5/2017 | Pakr | ............... | A45F 5/00 |
| 2018/0139857 A1* | 5/2018 | Cavenagh | ............ | G06F 1/1647 |
| 2019/0342440 A1* | 11/2019 | Coverstone | ......... | H04B 1/3888 |
| 2020/0050318 A1* | 2/2020 | Ure | ................. | G06F 1/1632 |
| 2020/0092405 A1* | 3/2020 | Harmon | ............. | G06F 1/1616 |

\* cited by examiner

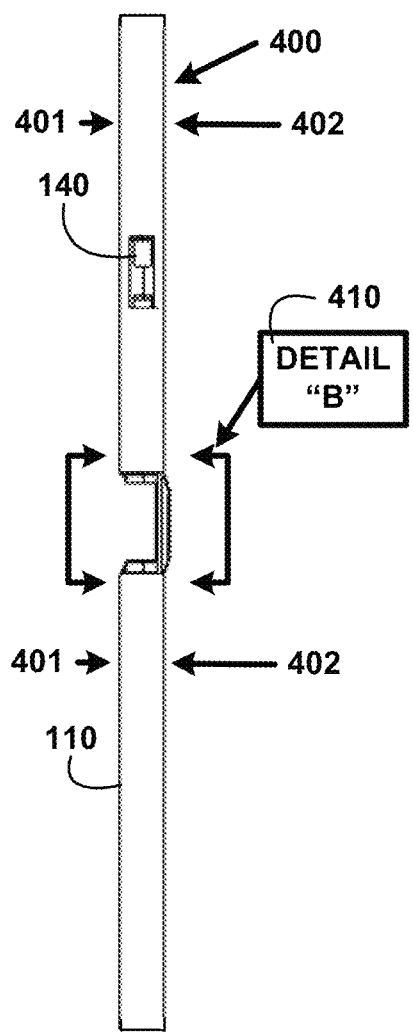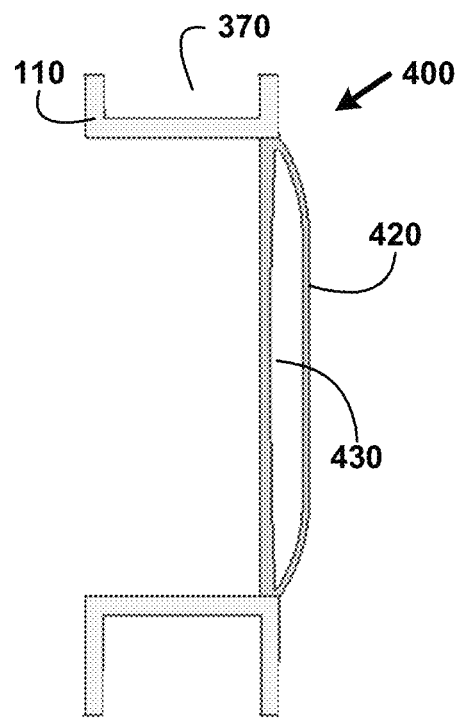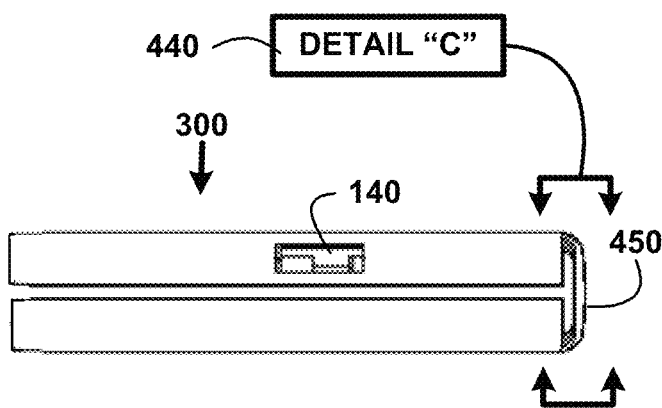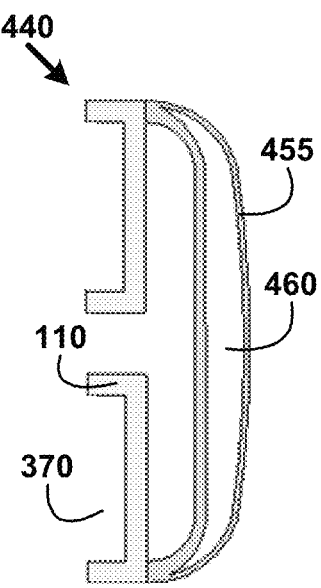
FIG. 4A
FIG. 4B
FIG. 4C
FIG. 4D

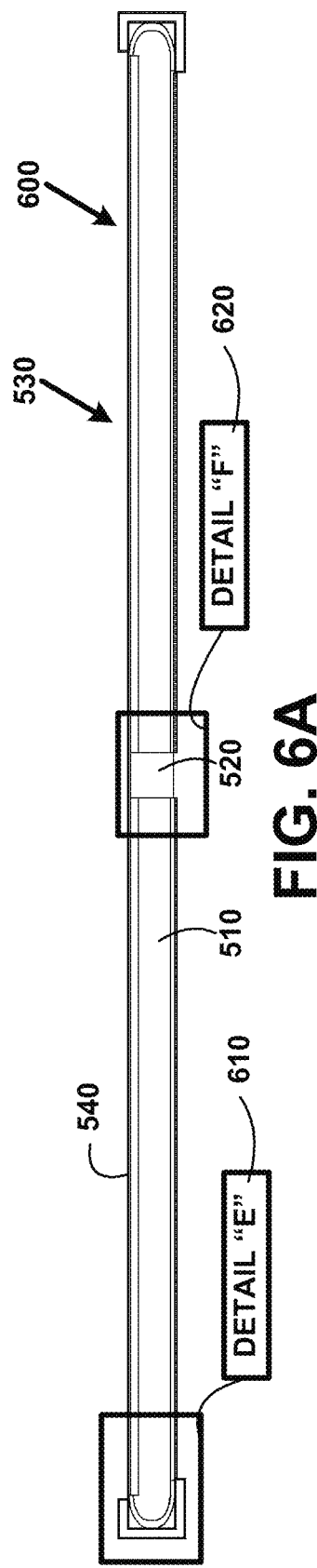
FIG. 6A
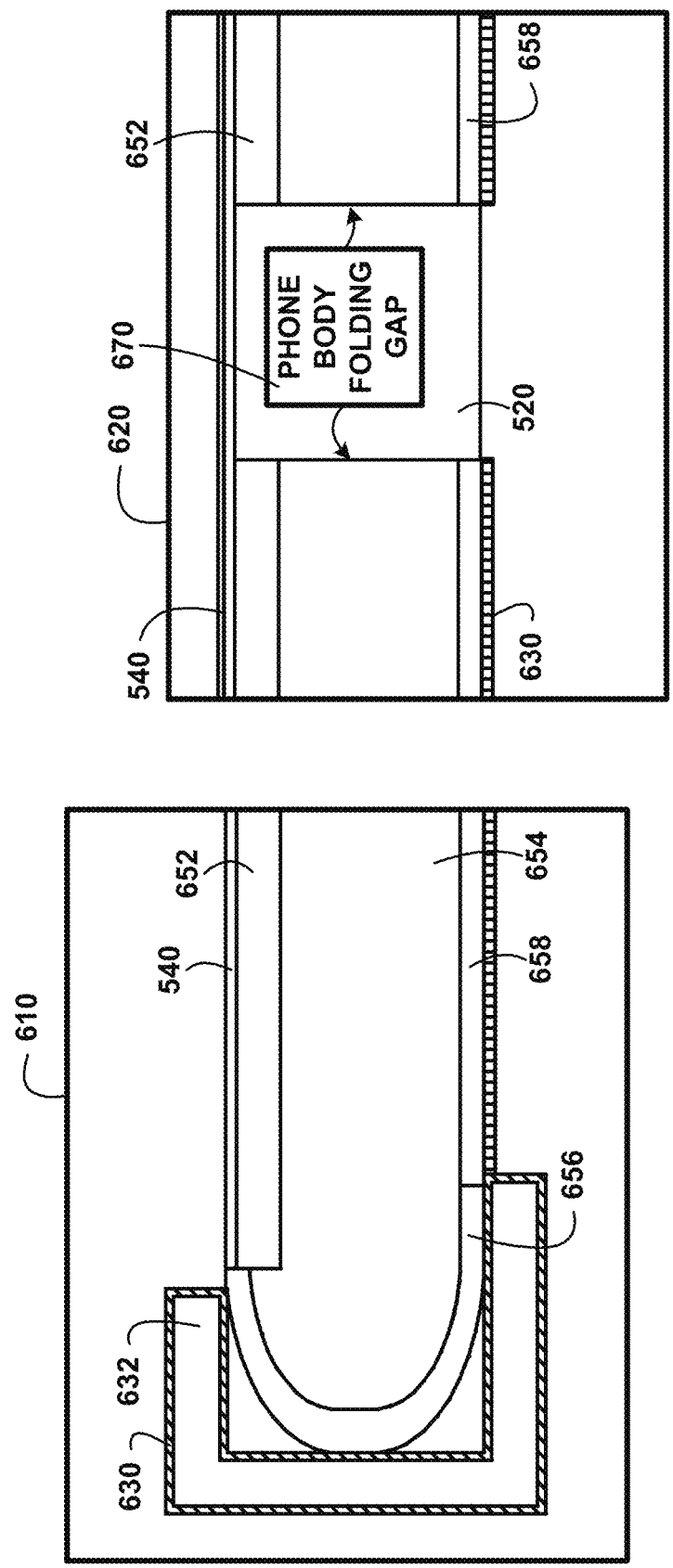
FIG. 6C
FIG. 6B

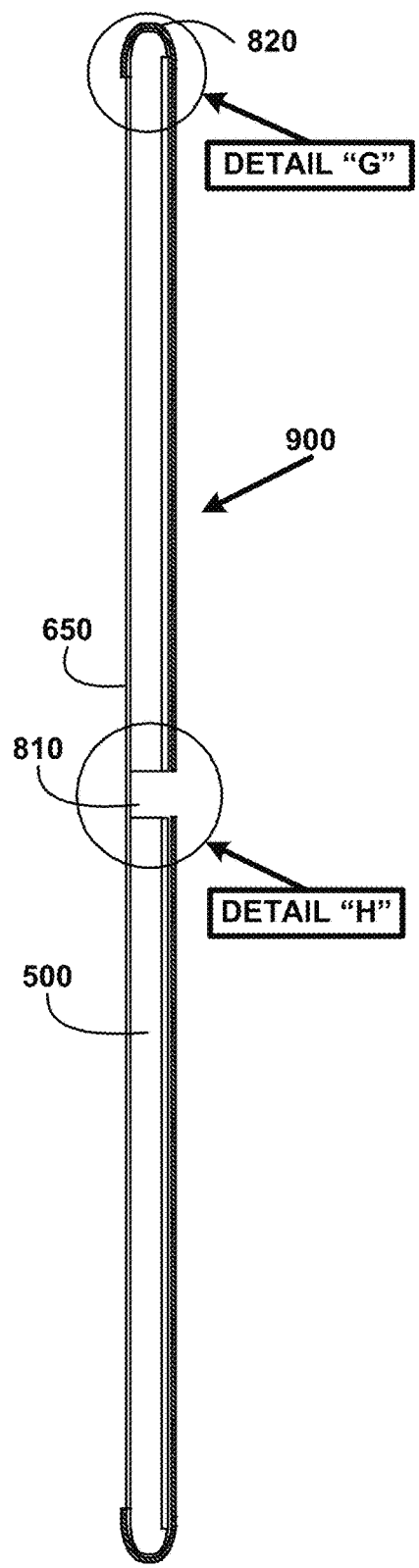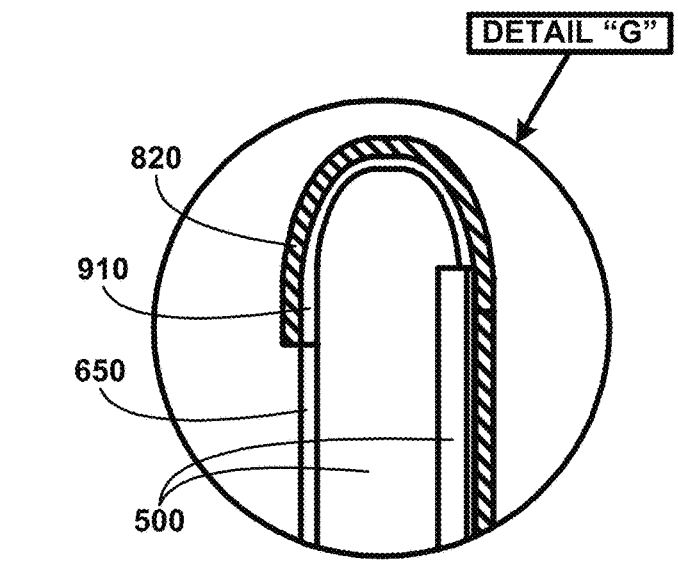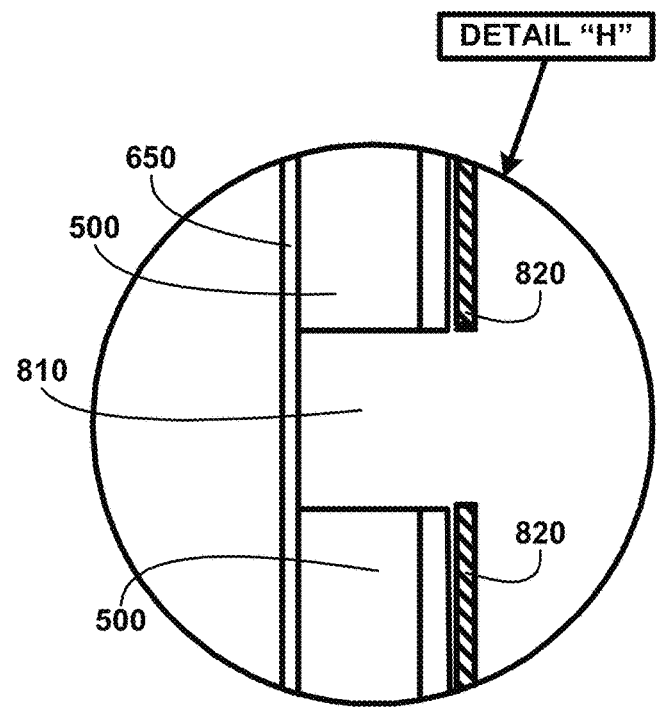
FIG. 9A
FIG. 9B
FIG. 9C

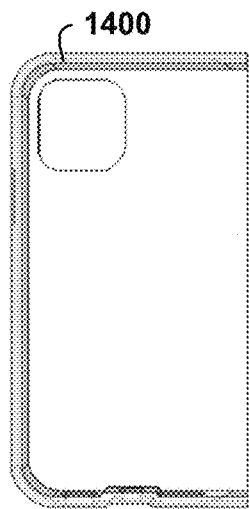
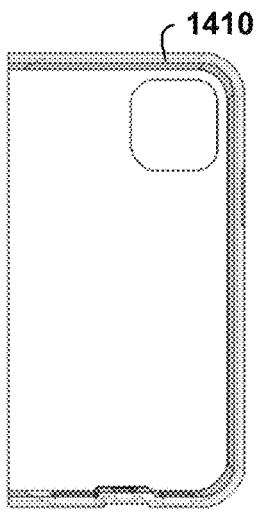
FIG. 14A
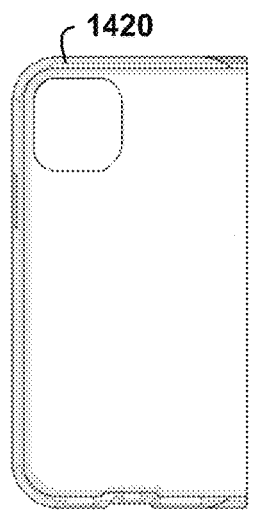
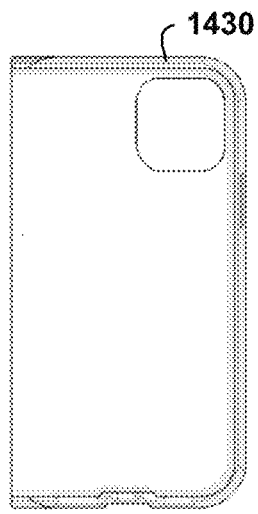
FIG. 14B
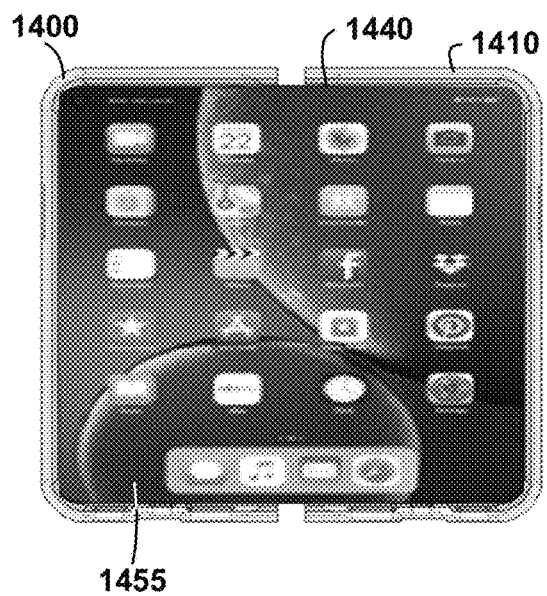
FIG. 14C
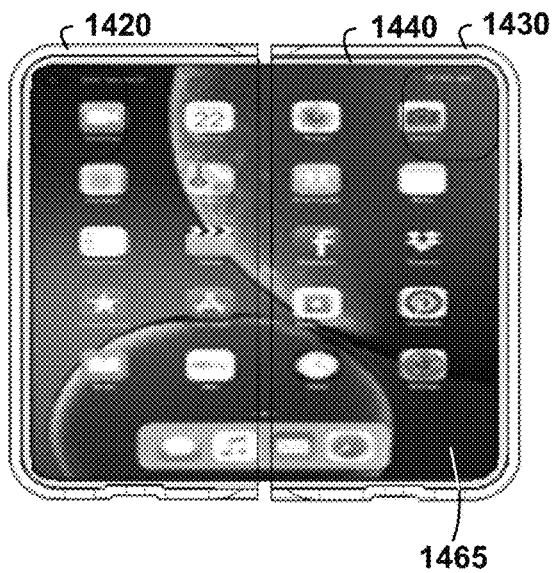
FIG. 14D

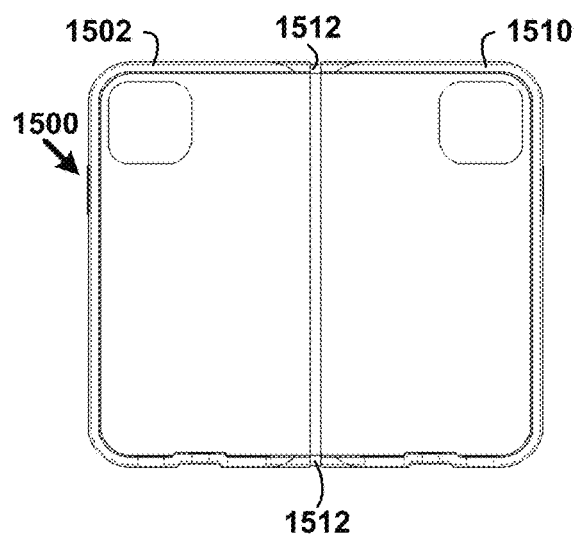
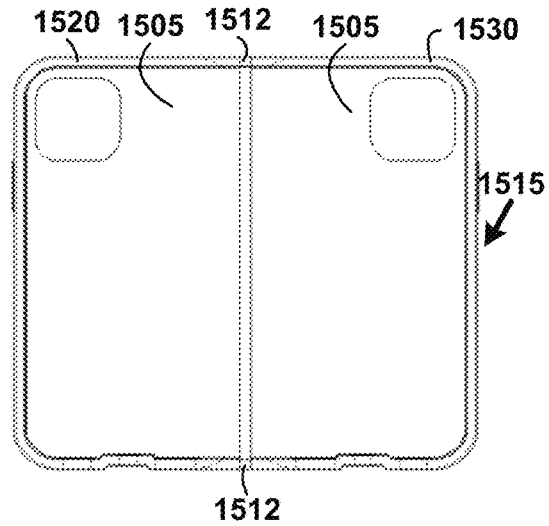
FIG. 15A　　FIG. 15B
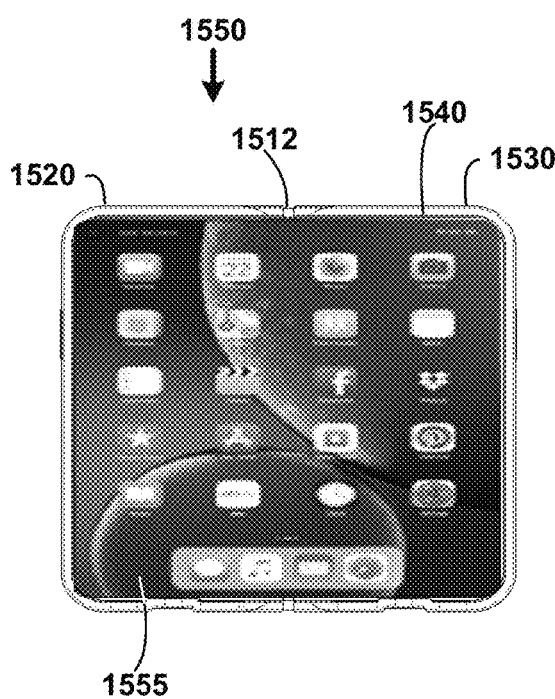
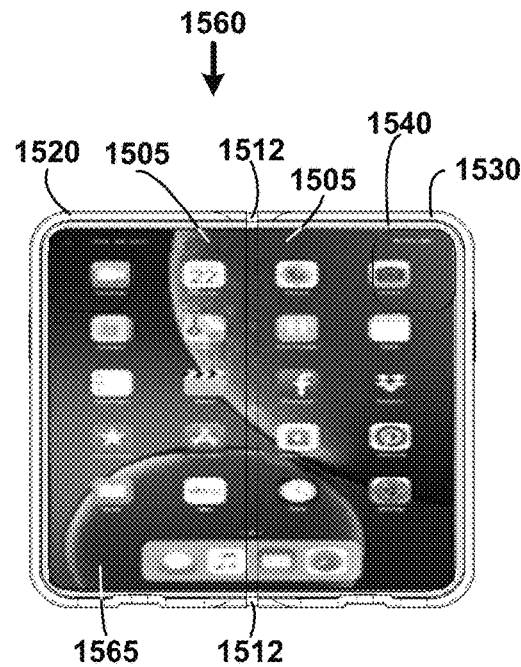
FIG. 15C　　FIG. 15D

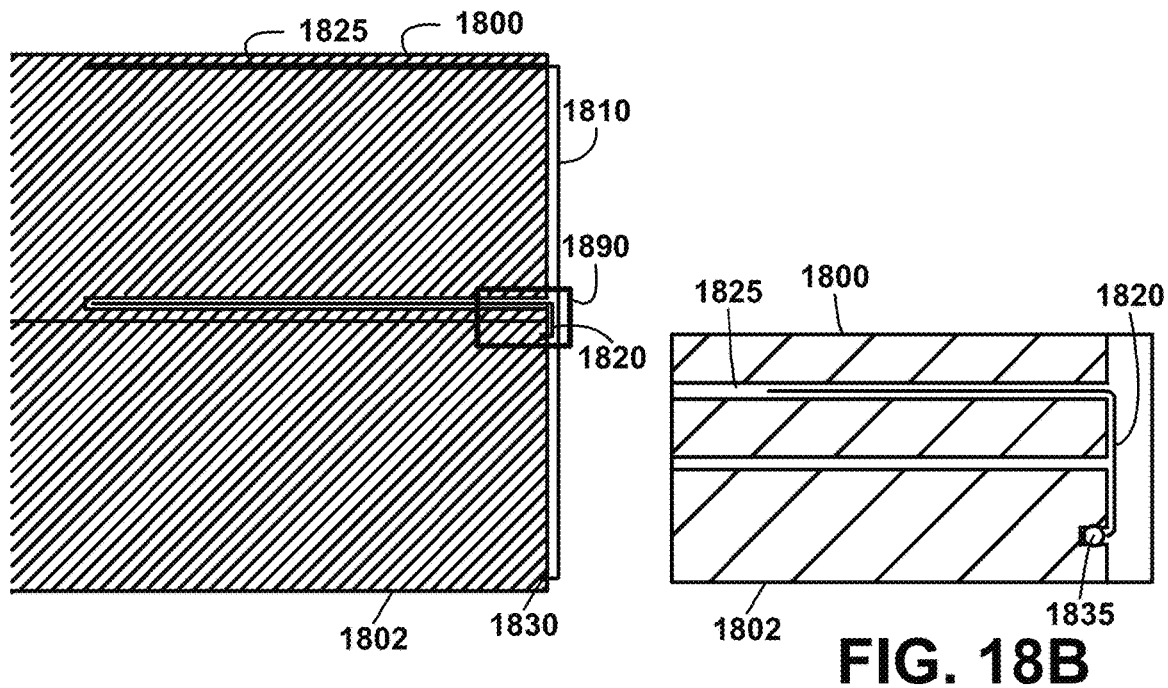
FIG. 18A
FIG. 18B
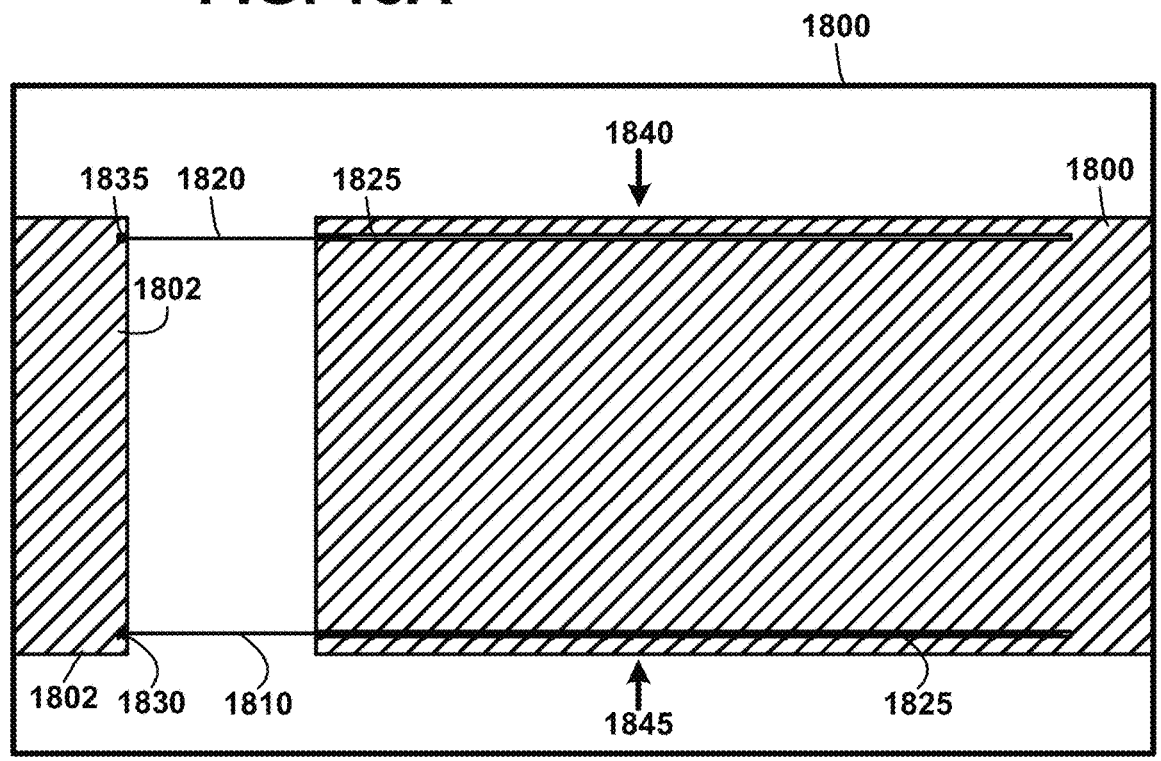
FIG. 18C

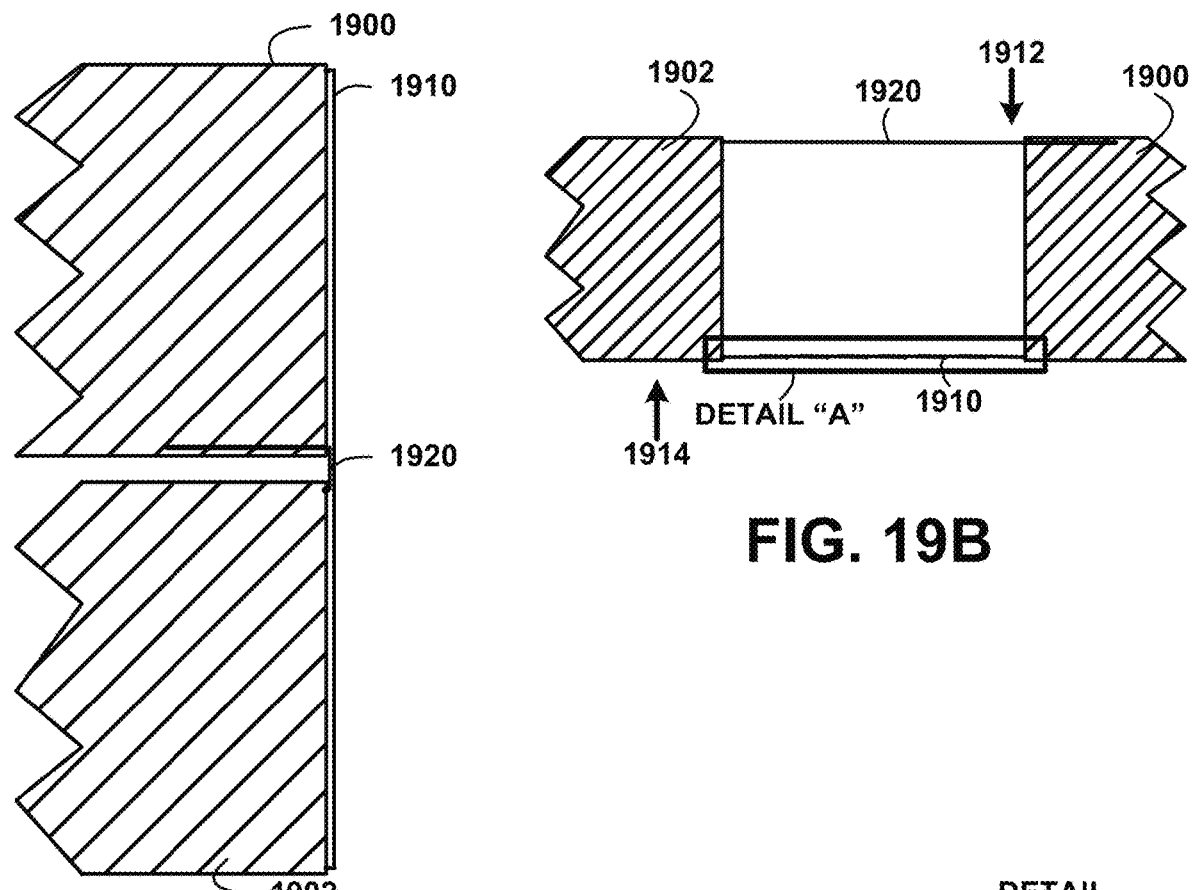
FIG. 19A
FIG. 19B
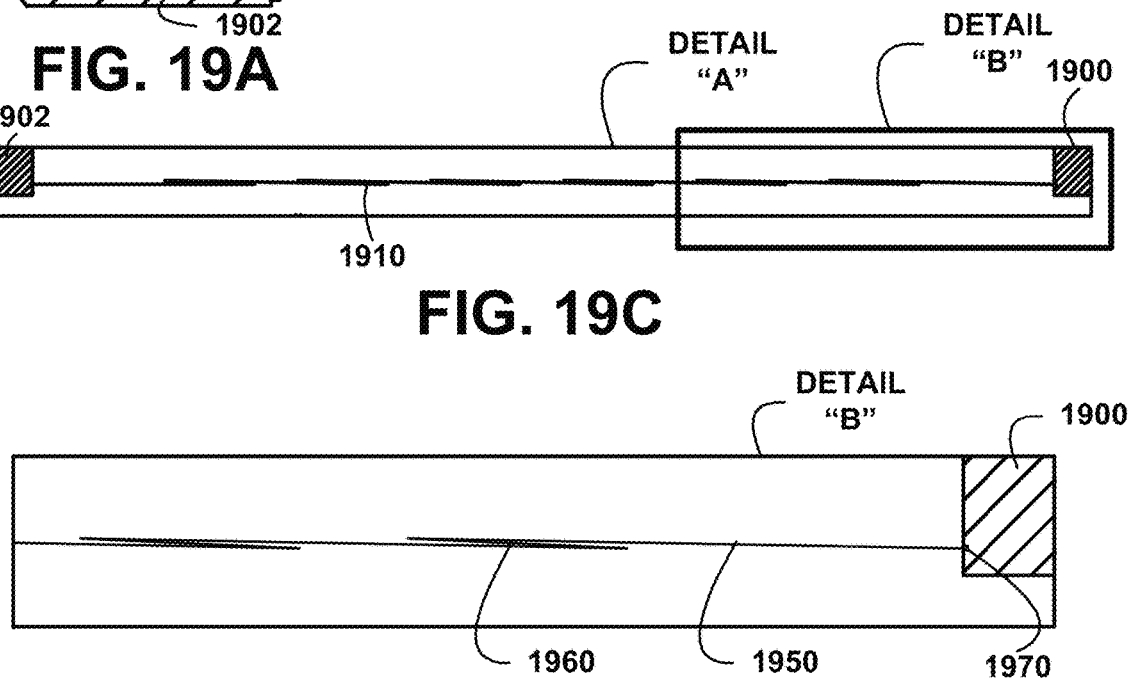
FIG. 19C
FIG. 19D

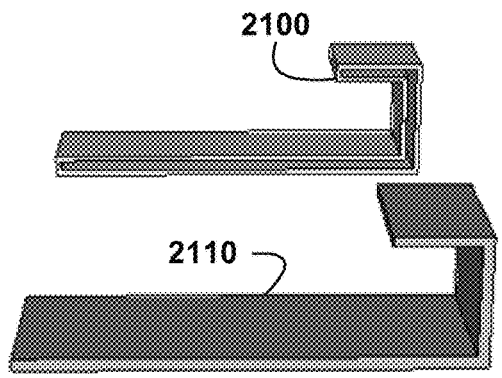
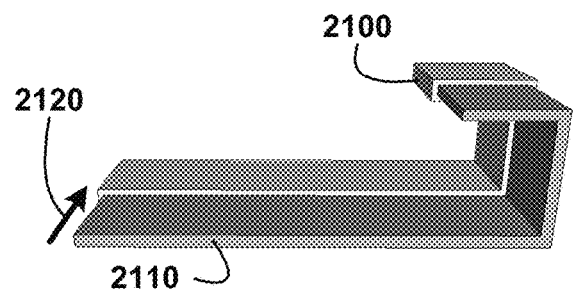
FIG. 21A  FIG. 21B
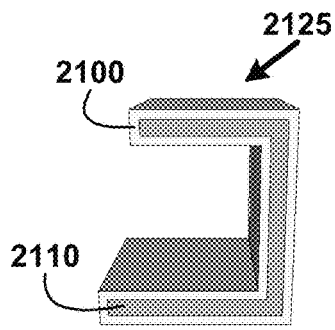
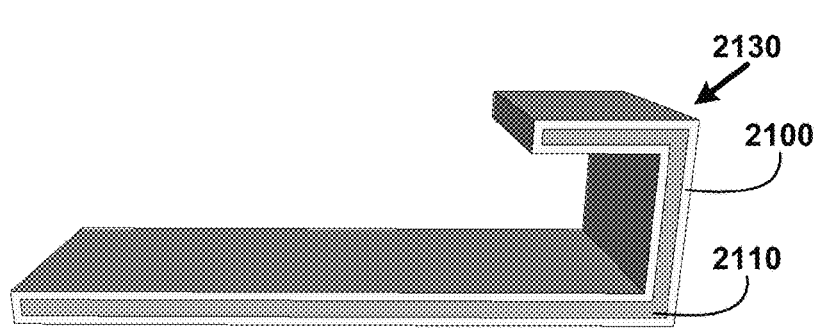
FIG. 21C  FIG. 21D
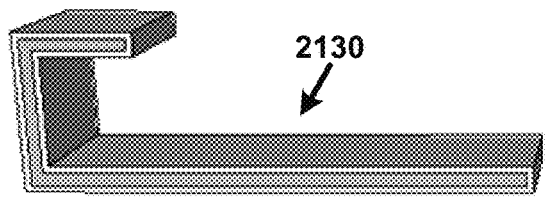
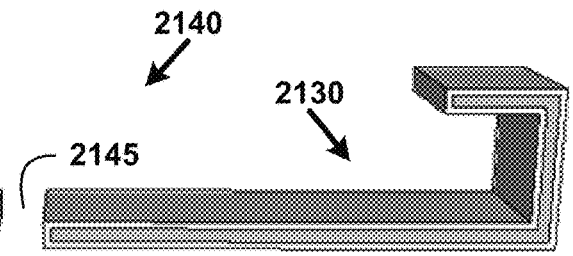
FIG. 21E
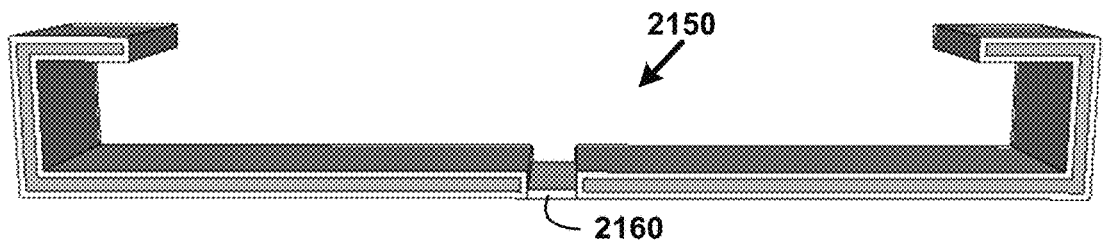
FIG. 21F

FOLDABLE PHONE CASE METHOD AND DEVICES

This Patent Application is a Continuation and claims priority to United States Patent Application entitled: "A FOLDABLE PHONE CASE METHOD AND DEVICES", U.S. Ser. No. 16/803,988 as filed on Feb. 27, 2020 filed by Eli Altaras et al., the U.S. Patent Application being incorporated herein by reference.

BACKGROUND

The entry into the market of cell phones that are foldable has left many of the buyers exposed to damaging the foldable cell phones when dropped or exposed to a force impacted against the foldable cell phones when folded or unfolded. Damage to the foldable screen can be much more expensive to repair than the typical glass cover on unfoldable cell phones.

BRIEF DESCRIPTION OF THE DRAWINGS

FIG. 4A shows for illustrative purposes only an example of a top to bottom foldable phone case side view of one embodiment.

FIG. 4B shows for illustrative purposes only an example of a top to bottom foldable phone case flexible connector unfolded cross section of one embodiment.

FIG. 4C shows for illustrative purposes only an example of a top to bottom foldable phone case folded side view of one embodiment.

FIG. 4D shows for illustrative purposes only an example of a top to bottom foldable phone case folded side view cross section of one embodiment.

FIG. 6A shows for illustrative purposes only an example of a side to side foldable phone case side view cross section of one embodiment.

FIG. 6B shows for illustrative purposes only an example of a side to side foldable phone case side edge cross section of one embodiment.

FIG. 6C shows for illustrative purposes only an example of a side to side foldable phone case cross section of one embodiment.

FIG. 9A shows for illustrative purposes only an example of a cross section view of one embodiment.

FIG. 9B shows for illustrative purposes only an example of a cross section detail "G" of one embodiment.

FIG. 9C shows for illustrative purposes only an example of a cross section detail "H" of one embodiment.

FIG. 14A shows for illustrative purposes only an example of a two section clear foldable phone case back view of one embodiment.

FIG. 14B shows for illustrative purposes only an example of a two section clear foldable phone case front view of one embodiment.

FIG. 14C shows for illustrative purposes only an example of a two section clear foldable phone case coupled to a foldable phone of one embodiment.

FIG. 14D shows for illustrative purposes only an example of a two section clear foldable phone case coupled to a foldable phone of one embodiment.

FIG. 15A shows for illustrative purposes only an example of a one section clear foldable phone case back view of one embodiment.

FIG. 15B shows for illustrative purposes only an example of a one section clear foldable phone case front view of one embodiment.

FIG. 15C shows for illustrative purposes only an example of a foldable phone coupled to a one section clear foldable phone case back view of one embodiment.

FIG. 15D shows for illustrative purposes only an example of a foldable phone coupled to a one section clear foldable phone case front view of one embodiment.

FIG. 18A shows for illustrative purposes only an example of a folded anchored foldable phone case sliding connector of one embodiment.

FIG. 18B shows for illustrative purposes only an example of a detail of a folded anchored foldable phone case sliding connector of one embodiment.

FIG. 18C shows for illustrative purposes only an example of a detail of an unfolded anchored foldable phone case sliding connector of one embodiment.

FIG. 19A shows for illustrative purposes only an example of a folded foldable phone case with a shutter connector of one embodiment.

FIG. 19B shows for illustrative purposes only an example of a detail of an unfolded foldable phone case with a shutter connector of one embodiment.

FIG. 19C shows for illustrative purposes only an example of an unfolded shutter connector of one embodiment.

FIG. 19D shows for illustrative purposes only an example of a detail of an unfolded shutter connector of one embodiment.

FIG. 21A shows for illustrative purposes only an example of a hard material foldable phone case of one embodiment.

FIG. 21B shows for illustrative purposes only an example of inserting a second hard material insert of one embodiment.

FIG. 21C shows for illustrative purposes only an example of a two sided screen foldable phone hard material foldable phone case of one embodiment.

FIG. 21D shows for illustrative purposes only an example of an inserted layered hard material foldable phone case of one embodiment.

FIG. 21E shows for illustrative purposes only an example of an inserted layered hard material foldable phone case of one embodiment.

FIG. 21F shows for illustrative purposes only an example of a one piece hard material foldable phone case of one embodiment.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of a foldable phone case method and devices is described for illustrative purposes and the underlying system can apply to any number and multiple types of foldable digital devices including phones and tablets.

In one embodiment of the present invention, the foldable phone case method and devices can be configured using foldable connectors. The foldable phone case method and devices can be configured to include a two-part foldable phone case without a connector and can be configured to include a one piece foldable phone case using the present invention. It should be understood that the present invention may be configured for use on side to side, top to bottom foldable phones and tablets including triple foldable phones and tablets. In all embodiments of the foldable phone case it should be noted a screen protector may be coupled with the foldable phone case from a selection from a group of screen protectors including tempered glass, bendable tempered glass, plastic, bendable plastic, a liquid glass coating applied to a foldable phone screen and all materials that provide the screen protector characteristics demonstrated by the other selections. In all embodiments of the foldable phone case it should be noted a kickstand may be coupled to the foldable phone case.

Figure 1:
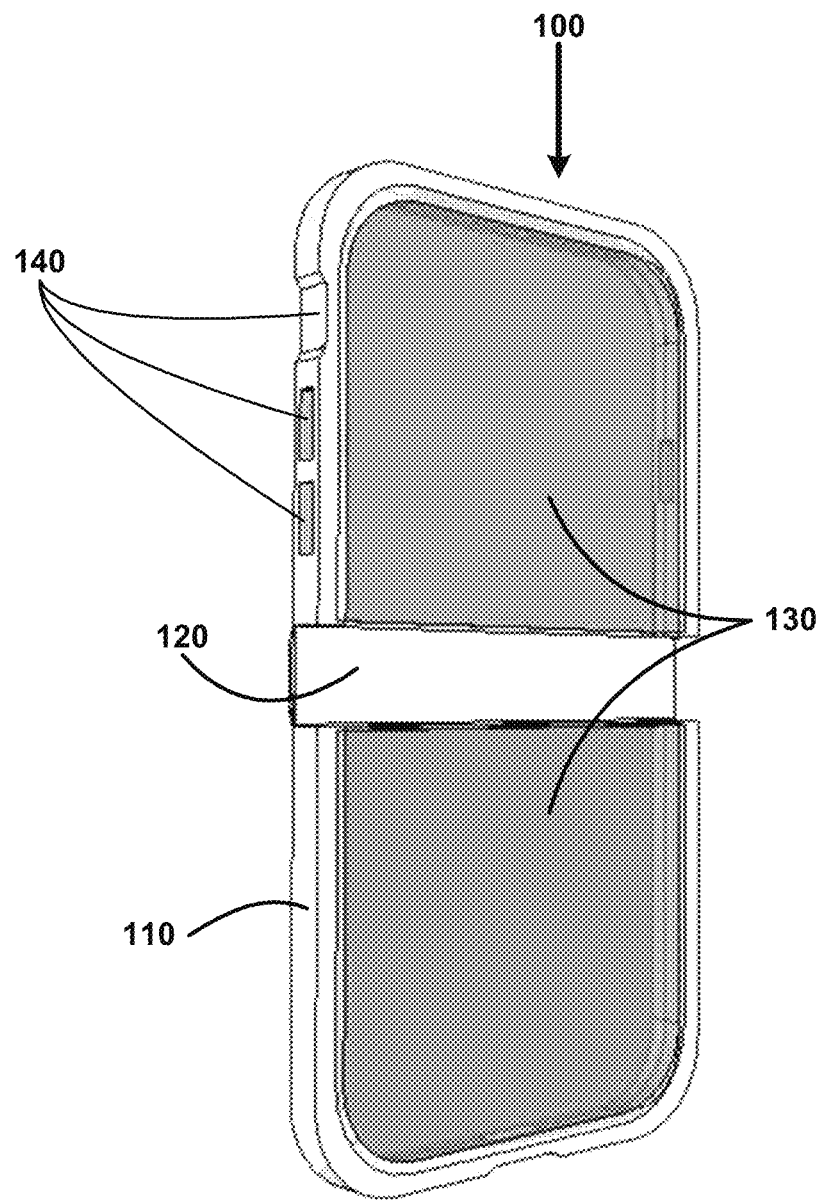
FIG. 1 shows for illustrative purposes only an example of an overview of a top to bottom foldable phone case of one embodiment.

FIG. 1 shows for illustrative purposes only an example of an overview of a top to bottom foldable phone case of one embodiment. FIG. 1 shows a top to bottom foldable case unfolded front view 100. A top to bottom foldable phone case 110 may include a flexible rubber air cushioned connector 120.

In one embodiment the top to bottom foldable phone case 110 and the flexible rubber air cushioned connector 120 may be made of a flexible material selected from a group of flexible materials with many properties, including elasticity, transparency, and resistance to oil, grease and abrasion.

In other embodiments a foldable phone case may be made from a group of selectable flexible materials including thermoplastic polyurethane (TPU) rubber, clear flexible rubber, silicone, rubber and any other material that bends and flexes.

In another embodiment a foldable phone case may be made from a group of selectable hard rigid materials including polycarbonate (PC), carbon fiber, metal, glass, and composite materials.

In yet another embodiment a hybrid foldable phone case may be made from at least one of the group of selectable flexible materials and at least one of the group of selectable hard rigid materials.

All embodiments of the foldable phone case may be configured to include an RFID chip embedded into the foldable phone case structure for locating and identifying a user's foldable phone case. Each RFID chip will include a unique ID number registered for a user of one embodiment.

The top to bottom foldable phone case 110 includes phone function button access ports 140 configured to match a size, shape and location of a specific foldable phone function button and other functions for providing user access to those features.

FIG. 1 also shows a two-piece front tempered glass screen protector 130. The tempered glass screen protectors allow the user to see both sections of a single foldable phone screen that spans both the top to bottom sections of the phone. In one embodiment a foldable phone case may not include a tempered glass screen protector. In yet another embodiment a foldable phone case may be coupled to a foldable phone that has a liquid glass coating applied to the foldable screen. In one embodiment a screen protector may be configured to be film, liquid coating screen protector or any other material screen protector.

The flexible rubber air cushioned connector 120 includes an air cushioned chamber that encloses a volume of air that creates an apparatus for preventing damage to the foldable portion of the foldable phone in both a folded and unfolded condition of one embodiment.

DETAILED DESCRIPTION

Figure 2:
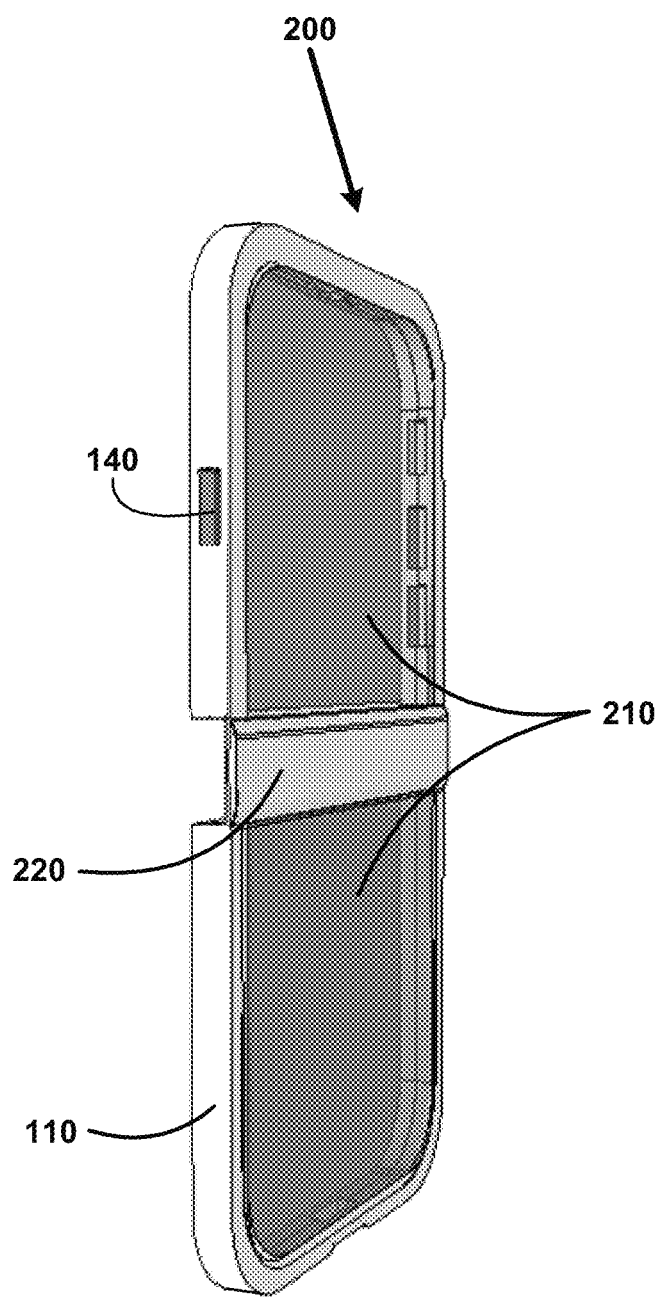
FIG. 2 shows for illustrative purposes only an example of a top to bottom foldable phone case back view of one embodiment.

FIG. 2 shows for illustrative purposes only an example of a top to bottom foldable phone case back view of one embodiment. FIG. 2 shows a top to bottom foldable phone case unfolded back view 200. In one embodiment the top to bottom foldable phone case 110 may in one embodiment include a two-piece back tempered glass screen protector 210. A flexible rubber air cushioned relaxed connector back view 220 is configured in size and position for folding and unfolding concurrently with folding and unfolding the foldable phone. The volume of air contained within the flexible rubber air cushioned relaxed connector is configured for providing protection continuously while the foldable phone is folded, unfolded and during the folding or unfolding action. In one embodiment the flexible rubber air cushioned relaxed connector may be made of a material selected from a group of clear and colored materials including TPU, flexible rubber, silicone, rubber and any other material that bends and flexes of one embodiment.

Figure 3A:
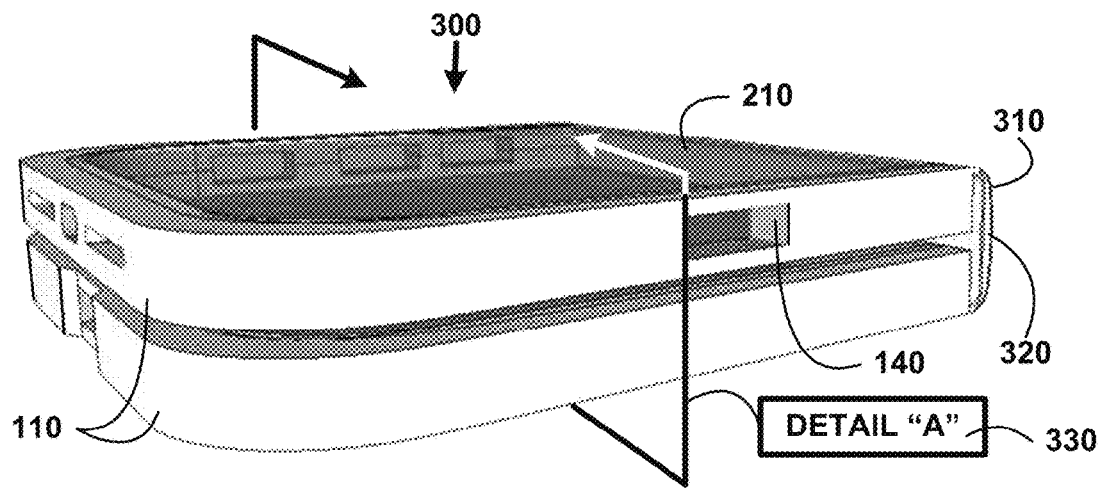
FIG. 3A shows for illustrative purposes only an example of a top to bottom foldable phone case folded of one embodiment.

FIG. 3A shows for illustrative purposes only an example of a top to bottom foldable phone case folded of one embodiment. FIG. 3A shows a flexible top to bottom foldable phone case folded 300 and a flexible rubber air cushioned stretched connector first side view 310. A flexible rubber air cushioned stretched connector pressurized air chamber extended wall 320 can be seen. The flexible rubber air cushioned stretched connector 120 constricts the volume of air contained within the flexible rubber air cushioned connector increases the pressure causing the wall of the flexible rubber air cushioned connector to extend outward. FIG. 3A also shows detail "A" 330 indicators, the two-piece back tempered glass screen protector 210, phone function button access ports 140 and the top to bottom foldable phone case 110 of one embodiment.

Figure 3B:
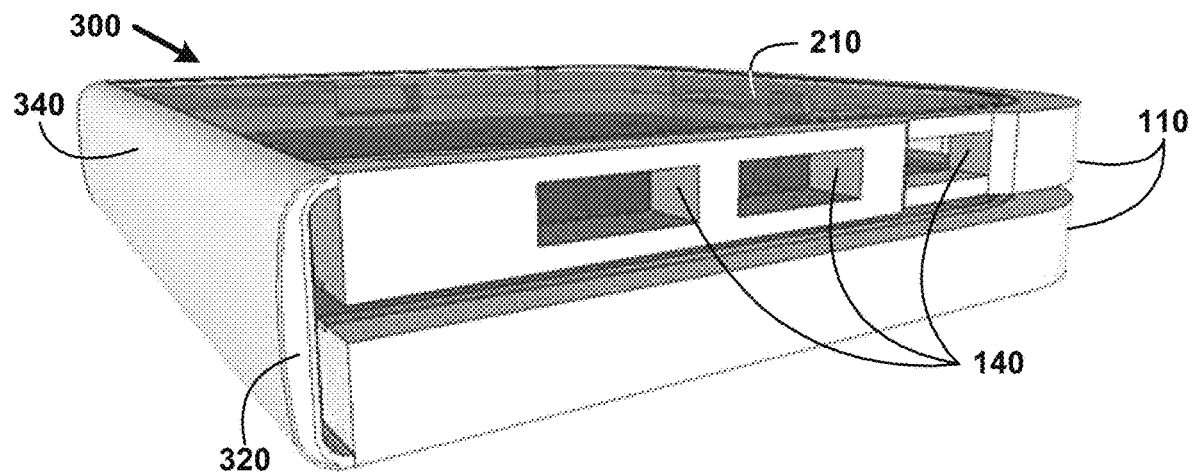
FIG. 3B shows for illustrative purposes only an example of a top to bottom foldable phone case folded other side view of one embodiment.

FIG. 3B shows for illustrative purposes only an example of a top to bottom foldable phone case folded other side view of one embodiment. FIG. 3B shows the top to bottom foldable phone case folded 300 and a flexible rubber air cushioned stretched connector in a back view 340. Showing is the flexible rubber air cushioned stretched connector pressurized air chamber extended wall 320. Also seen is the two-piece back tempered glass screen protector 210, phone function button access ports 140 and the top to bottom foldable phone case 110 of one embodiment.

Figure 3C:
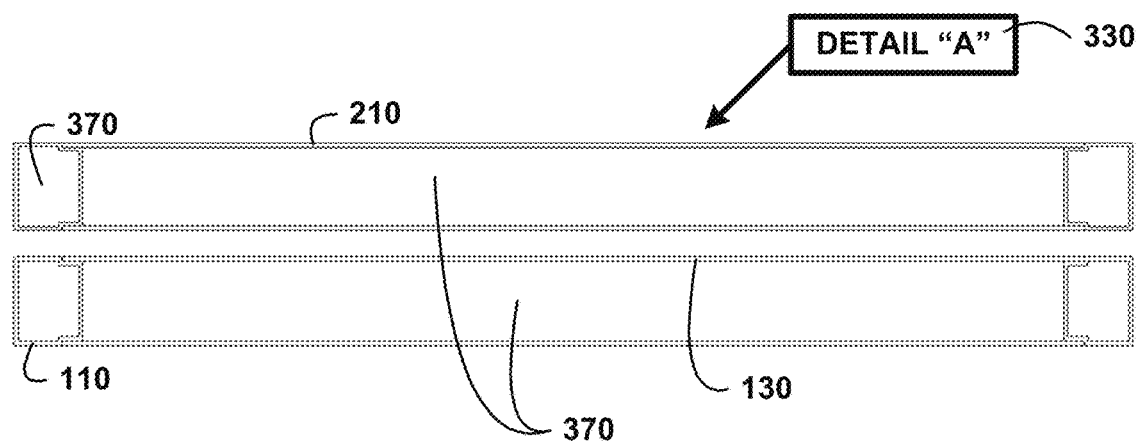
FIG. 3C shows for illustrative purposes only an example of a top to bottom foldable phone case folded cross section view of one embodiment.

FIG. 3C shows for illustrative purposes only an example of a top to bottom foldable phone case folded cross section view of one embodiment. FIG. 3C shows detail "A" 330 with a cross section view of the two-piece back tempered glass screen protector 210, two-piece front tempered glass screen protector 130, top to bottom foldable phone case 110, top to bottom foldable phone case interior air chamber 370. The body of the foldable phone is positioned within the top to bottom foldable phone case 110 between the two-piece back tempered glass screen protector 210 and two-piece front tempered glass screen protector 130 of one embodiment.

FIG. 4A shows for illustrative purposes only an example of a top to bottom foldable phone case side view of one embodiment. FIG. 4A shows a top to bottom foldable phone case unfolded side view 400. Also showing are phone function button access ports 140 and the top to bottom foldable phone case 110. A user will be able to view a front foldable phone screen 401 spanning the top to the bottom and a back foldable phone screen 402 spanning the top to the bottom. Detail "B" 410 indicators illustrate the area shown as a cross section view in FIG. 4B of one embodiment.

FIG. 4B shows for illustrative purposes only an example of a top to bottom foldable phone case flexible connector unfolded cross section of one embodiment. FIG. 4B shows the detail "B" 410 cross section of the top to bottom foldable phone case unfolded side view 400. The top to bottom foldable phone case 110 with a top to bottom foldable phone case interior air chamber 370. Also seen is a flexible rubber air cushioned relaxed connector back wall 420 with a flexible rubber air cushioned relaxed connector cushioned air chamber 430 of one embodiment.

FIG. 4C shows for illustrative purposes only an example of a top to bottom foldable phone case folded side view of one embodiment. FIG. 4C shows the top to bottom foldable phone case folded 300 in a side view showing the phone function button access ports 140. Also seen is a side view of a flexible rubber air cushioned stretched connector 450 in the folded position with detail "C" 440 indicators of one embodiment.

FIG. 4D shows for illustrative purposes only an example of a top to bottom foldable phone case folded side view cross section of one embodiment. FIG. 4D shows the detail "C" 440 cross section view of the top to bottom foldable phone case 110, top to bottom foldable phone case interior air chamber 370 and flexible rubber air cushioned folded connector extended back wall 455. The flexible rubber air cushioned folded connector extended back wall 455 indicates a flexible rubber air cushioned folded connector pressurized cushioned air chamber 460 of one embodiment.

Figure 5:
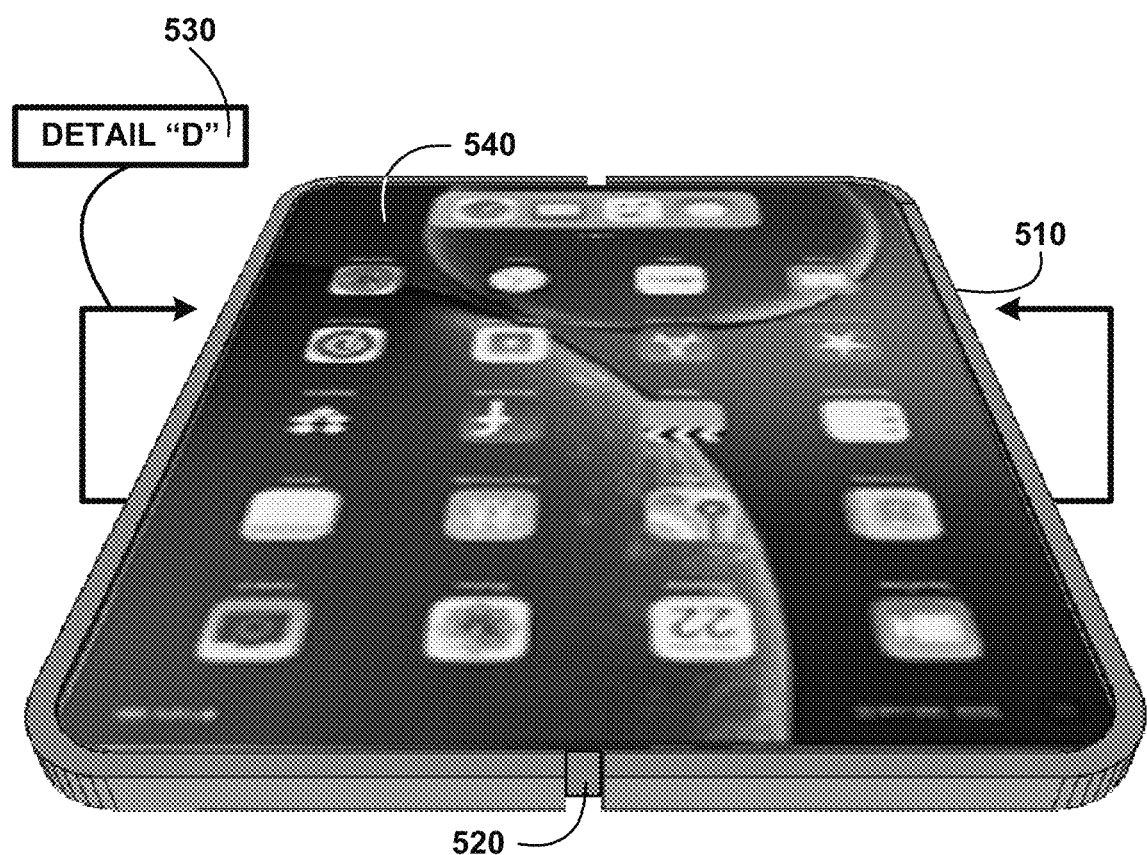
FIG. 5 shows for illustrative purposes only an example of a side to side foldable phone case of one embodiment.

A Flexible Side to Side Foldable Phone Case:

FIG. 5 shows for illustrative purposes only an example of a side to side foldable phone case of one embodiment. FIG. 5 shows a side to side foldable phone 520 with a coupled side to side foldable phone case 510. The side to side foldable phone 520 includes a flexible side to side foldable phone screen 540. In one embodiment the side to side foldable phone 520 includes a flexible side to side foldable phone screen on both the front and back. The side to side foldable phone case 510 allows the user to view both front and back screens. Detail "D" 530 indicators show the area for a cross section that is shown in FIG. 6A of one embodiment.

FIG. 6A shows for illustrative purposes only an example of a side to side foldable phone case side view cross section of one embodiment. FIG. 6A shows the cross section indicated by detail "D" 530 of FIG. 5 of the side to side foldable phone case 510 and side to side foldable phone 520. A side to side foldable phone case cross section view 600 further indicates detail "E" 610 and detail "F" 620 and shows the flexible side to side foldable phone screen 540 of one embodiment.

FIG. 6B shows for illustrative purposes only an example of a side to side foldable phone case side edge cross section of one embodiment. FIG. 6B shows a cross section as indicated by detail "E" 610 of a side to side foldable phone case 630. The cross section shows a side to side foldable phone case air chamber 632. Also showing is a side to side foldable phone case perimeter 656, side to side foldable phone interior electronics 654 and a side to side foldable phone flexible back case 658. Also showing is the flexible side to side foldable phone screen 540 above the side to side foldable phone screen electronics 652 of one embodiment.

FIG. 6C shows for illustrative purposes only an example of a side to side foldable phone case cross section of one embodiment. FIG. 6C shows the cross section indicated by detail "F" 620 showing the side to side foldable phone case 630 coupled against the side to side foldable phone flexible screen 540. Beneath the side to side foldable phone flexible screen 540 is the side to side foldable phone screen electronics 652. The side to side foldable phone flexible screen 540 includes a portion bridging a phone body folding gap 670. The side to side foldable phone 520 of FIG. 5 may include a side to side foldable phone back case 658 of one embodiment.

Figure 7A:
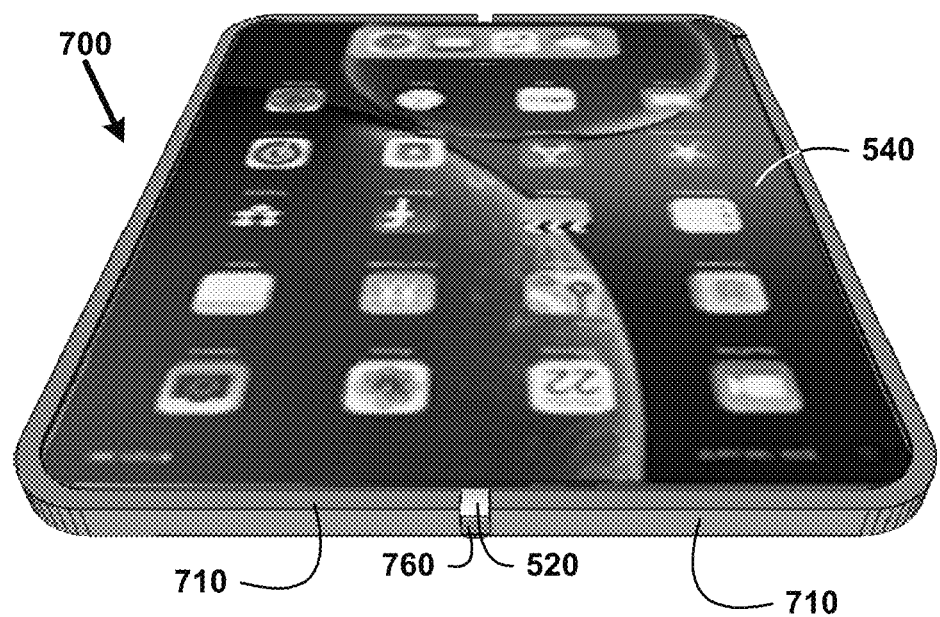
FIG. 7A shows for illustrative purposes only an example of a one piece side to side foldable phone case unfolded of one embodiment.

A One Piece Side to Side Foldable Phone Case Unfolded:

FIG. 7A shows for illustrative purposes only an example of a one piece side to side foldable phone case unfolded of one embodiment. FIG. 7 shows a one piece side to side foldable phone case unfolded 700 and coupled to a side to side foldable phone 520. The side to side foldable phone flexible screen 540 is shown spanning the unfolded area. The two sides of the one piece side to side foldable phone case 710 are joined using a flexible connector 760 forming the one piece side to side foldable phone case of one embodiment.

Figure 7B:
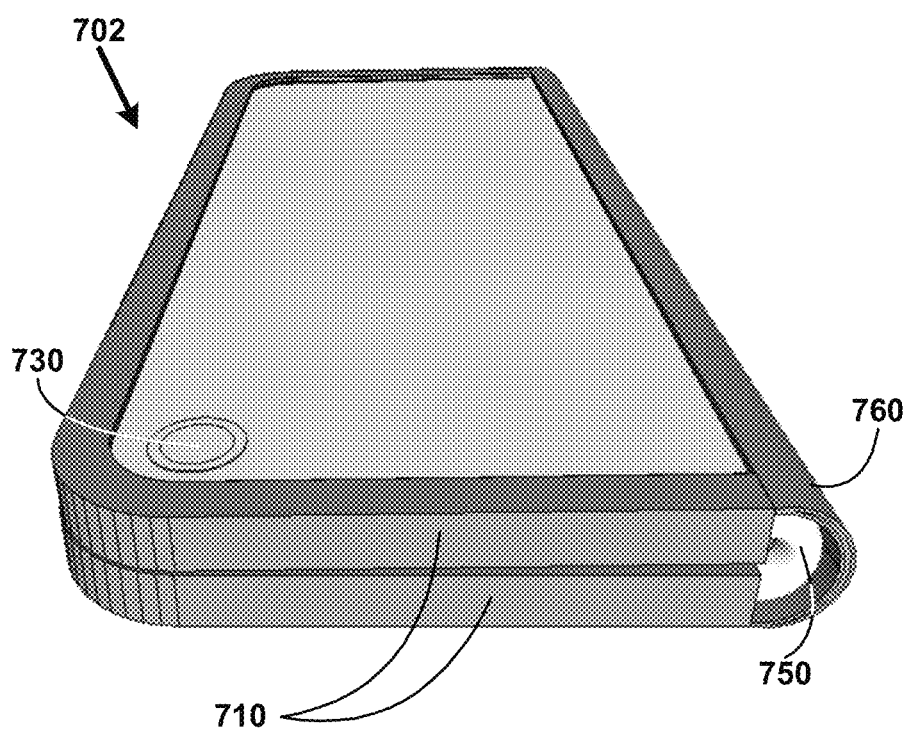
FIG. 7B shows for illustrative purposes only an example of a one piece side to side foldable phone case folded of one embodiment.

FIG. 7B shows for illustrative purposes only an example of a one piece side to side foldable phone case folded of one embodiment. FIG. 7B shows a one piece side to side foldable phone case folded 702. The one piece side to side foldable phone case provides protection to a side to side foldable phone camera 730.

A one piece side to side foldable phone case 710 also shows the folded flexible connector 760. The coupled flexible connector 760 has been stretched in the folding operation. A side to side foldable phone folded gap 750 shows the side to side foldable phone 520 of FIG. 5 phone body after being folded. The side to side foldable phone flexible screen 650 of FIG. 6B cannot be seen as it is on the back surface of the fold with the one piece side to side foldable phone case of one embodiment.

Figure 8A:
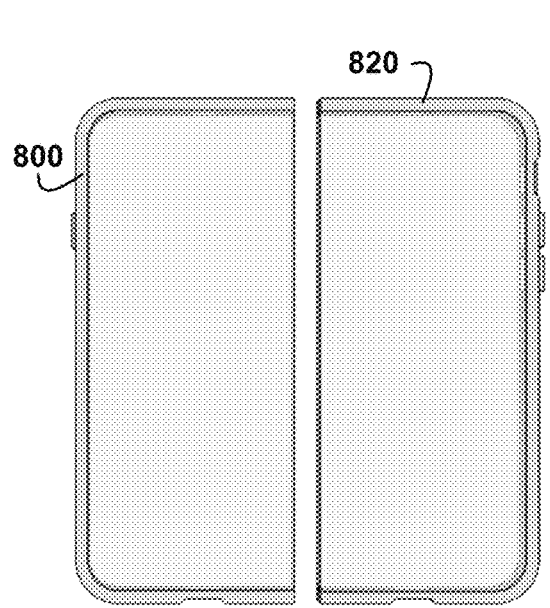
FIG. 8A shows for illustrative purposes only an example of a two-part foldable phone case of one embodiment.

Two-Part Foldable Phone Case:

FIG. 8A shows for illustrative purposes only an example of a two-part foldable phone case of one embodiment. FIG. 8A shows a two-part foldable phone case including a left side section of the two-part foldable phone case 800 and a right side section of the two-part foldable phone case 820. The left side section of the two-part foldable phone case 800 and the right side section of the two-part foldable phone case 820 are not connected of one embodiment.

Figure 8B:
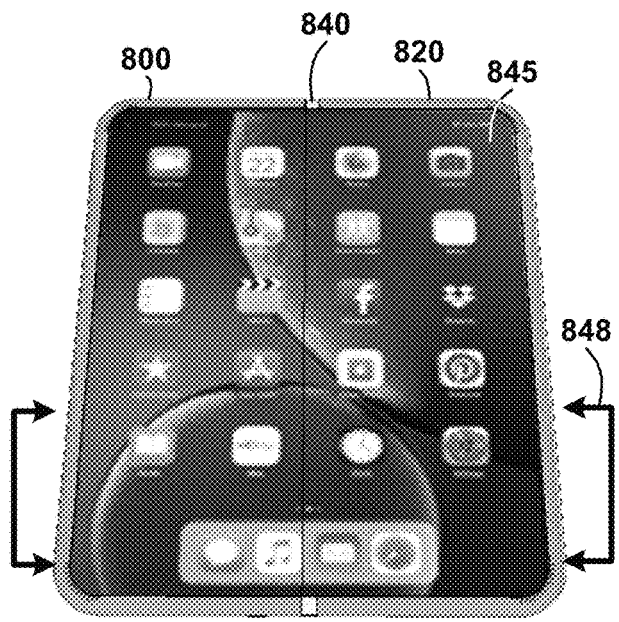
FIG. 8B shows for illustrative purposes only an example of a two-part foldable phone case coupled to a foldable phone of one embodiment.

FIG. 8B shows for illustrative purposes only an example of a two-part foldable phone case coupled to a foldable phone of one embodiment. FIG. 8B shows the two-part foldable phone case with the left side section of the two-part foldable phone case 800 and right side section of the two-part foldable phone case 820. A foldable phone 840 has been inserted into each section of the two-part foldable phone case showing the foldable phone flexible screen 845. A cross section indicator 848 shows the area of a cross section shown in FIG. 9A of one embodiment.

Figure 8C:
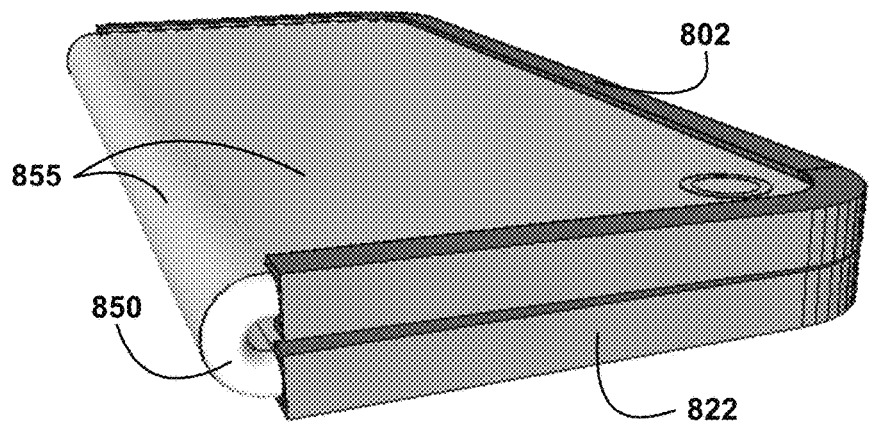
FIG. 8C shows for illustrative purposes only an example of a two-part foldable phone case coupled to a foldable phone folded of one embodiment.

FIG. 8C shows for illustrative purposes only an example of a two-part foldable phone case coupled to a foldable phone folded of one embodiment. FIG. 8C shows the two-part foldable phone case coupled to a foldable phone 840 of FIG. 8B folded. The left side section 802 has been folded over the right side section 822. The foldable phone folded 850 with the folding of the two-part foldable phone case shows the phone folded section and a back screen folded 855 of one embodiment.

FIG. 9A shows for illustrative purposes only an example of a cross section view of one embodiment. FIG. 9A shows a cross section view of a foldable phone coupled to a two-part foldable phone case 900. The side to side foldable phone 500 and foldable phone flexible screen 650 are shown coupled to the two-part foldable phone case 820.

Also showing is the foldable phone case folding gap 810. The cross section includes detail "G" and detail "H" to show a close up view of those areas of one embodiment.

FIG. 9B shows for illustrative purposes only an example of a cross section detail "G" of one embodiment. FIG. 9B shows detail "G" showing the side to side foldable phone frame 910, two-part foldable phone case side 820, side to side foldable phone 500, and side to side foldable phone flexible screen 650 of one embodiment.

FIG. 9C shows for illustrative purposes only an example of a cross section detail "H" of one embodiment. FIG. 9C shows detail "H" close up views of the side to side foldable phone flexible screen 650, side to side foldable phone 500, two-part foldable phone case folding gap 810, and two-part foldable phone case side 820 of one embodiment.

Figure 10A:
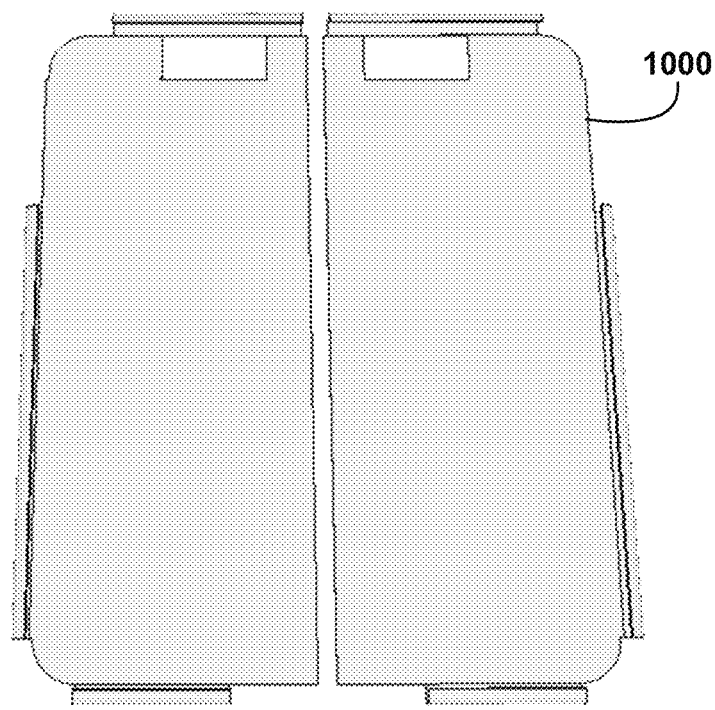
FIG. 10A shows for illustrative purposes only an example of a foldable single flexible inner case with two parts hard outer shell of one embodiment.

A Foldable Single Flexible Inner Case with Two Parts Hard Outer Shell:

FIG. 10A shows for illustrative purposes only an example of a foldable single flexible inner case with two parts hard outer shell of one embodiment. FIG. 10A shows a foldable single flexible inner case with two parts hard outer shell 1000. The foldable single flexible inner case with two parts hard outer shell 1000 provides a heavy duty protection. The hard outer shell is made of hard rigid material. The hard outer shell can be made a hard rigid material selected from a group including but not limited to polycarbonate (PC), carbon fiber, metal, glass, and composite materials. In some embodiments a foldable phone case may be configured as a hybrid made of a combination of both hard rigid and flexible materials.

The foldable phone case is supported by a hard outer shell of one embodiment.

Figure 10B:
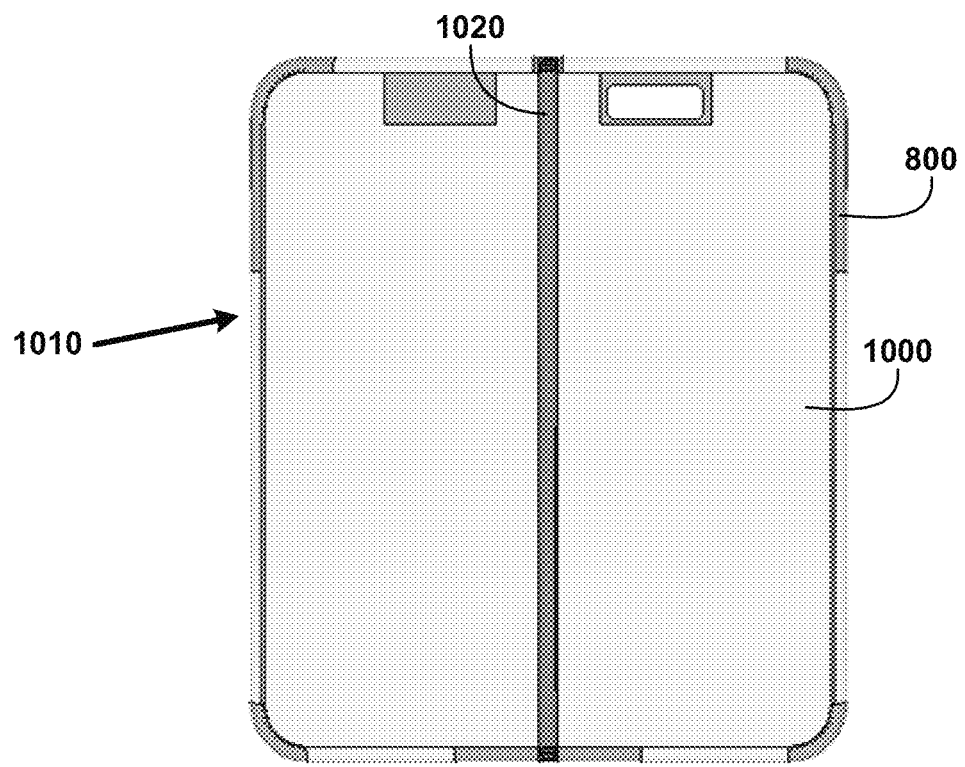
FIG. 10B shows for illustrative purposes only an example of a two part outer layer coupled to a foldable phone case of one embodiment.

FIG. 10B shows for illustrative purposes only an example of a two part outer layer coupled to a foldable phone case of one embodiment. FIG. 10B shows the foldable phone case two part hard outer shell 1000 coupled to the foldable phone case 800 with a back cover and a flexible connector 1020. The flexible connector 1020 unfolded provides protection while the foldable phone is opened and unfolded as seen in a back view of a foldable phone case 800 with a back cover and two part hard outer shell 1010 of one embodiment.

Figure 11A:
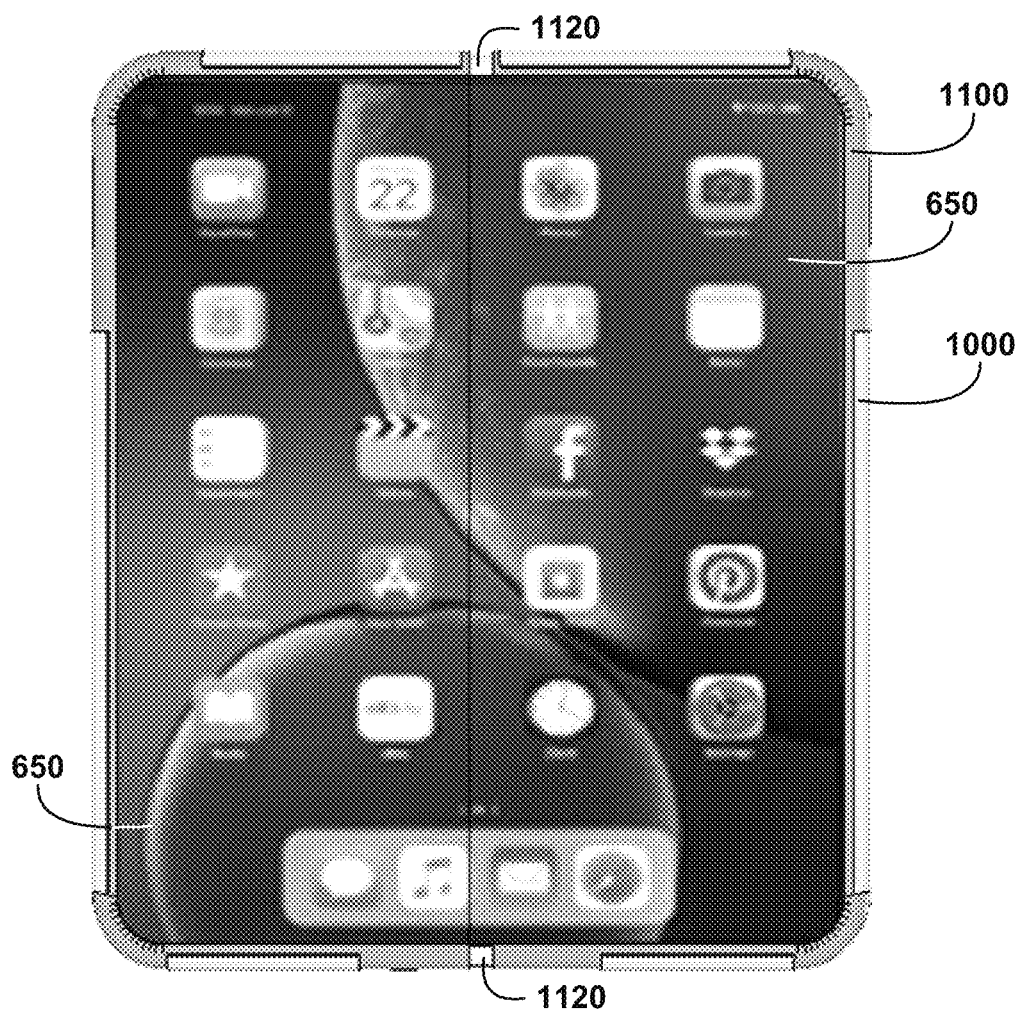
FIG. 11A shows for illustrative purposes only an example of a foldable phone coupled to a one piece side to side foldable phone case and two hard outer shells of one embodiment.

FIG. 11A shows for illustrative purposes only an example of a foldable phone coupled to a one piece side to side foldable phone case and two hard outer shells of one embodiment. FIG. 11A shows the one piece side to side foldable phone case 1100 with a back cover and with a flexible connector (not shown) coupled to the side to side foldable phone 1120 with the side to side foldable phone flexible screen 650. The foldable phone case two part hard outer shell 1000 provides an added level of protection of one embodiment.

Figure 11B:
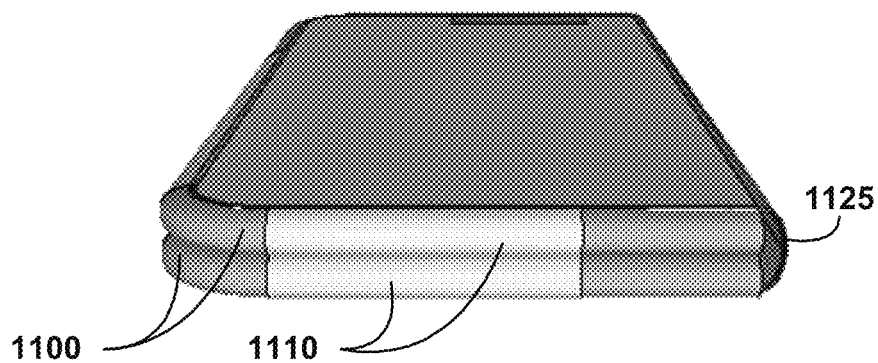
FIG. 11B shows for illustrative purposes only an example of a one piece side to side foldable phone case and two hard outer layers of one embodiment.

FIG. 11B shows for illustrative purposes only an example of a one piece side to side foldable phone case and two hard outer layers of one embodiment. FIG. 11B shows a foldable one piece side to side foldable phone case with a back cover and a flexible connector folded. In a folded position the flexible folded connector back wall stretched 1125 allow the folding to take place and still provide the protection for the foldable phone over the folded gap. Also showing with the one piece side to side foldable phone case 1100 are two hard outer shells coupled in folded mode 1110 wherein the two hard outer shells remain firmly coupled to the one piece side to side foldable phone case and maintains the protection provided of one embodiment.

Figure 12A:
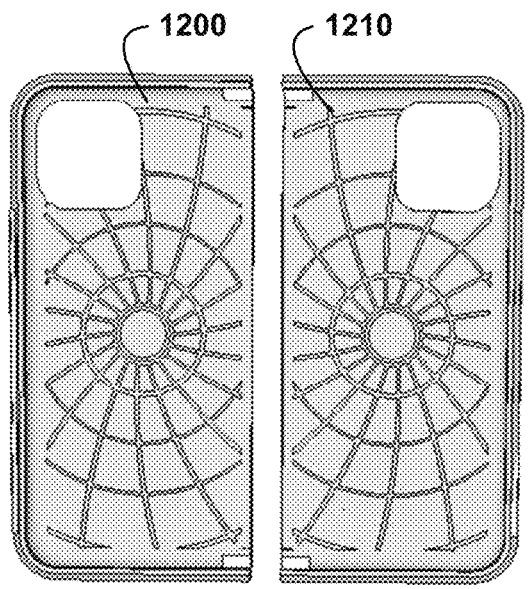
FIG. 12A shows for illustrative purposes only an example of a two section core foldable phone case coupled with a hard outer shell each of one embodiment.

Two Section Core Case with a Hard Outer Shell Each:

FIG. 12A shows for illustrative purposes only an example of a two section core foldable phone case coupled with a hard outer shell each of one embodiment. FIG. 12A shows a left side core foldable phone case 1200 and a right side core foldable phone case 1210 without any connector of one embodiment.

Figure 12B:
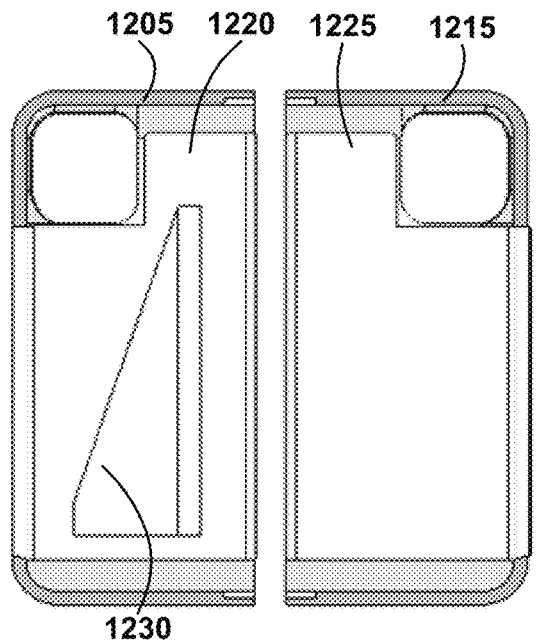
FIG. 12B shows for illustrative purposes only an example of two hard outer shells of one embodiment.

FIG. 12B shows for illustrative purposes only an example of two hard outer shells of one embodiment. FIG. 12B shows one hard outer shell 1220 coupled to the back side of the right side core foldable phone case 1205. Hard outer shell 1225 is coupled to the back side of the left side core foldable phone case 1215. Hard outer shell 1220 includes a coupled kickstand in a folded-in position 1230 of one embodiment.

Figure 12C:
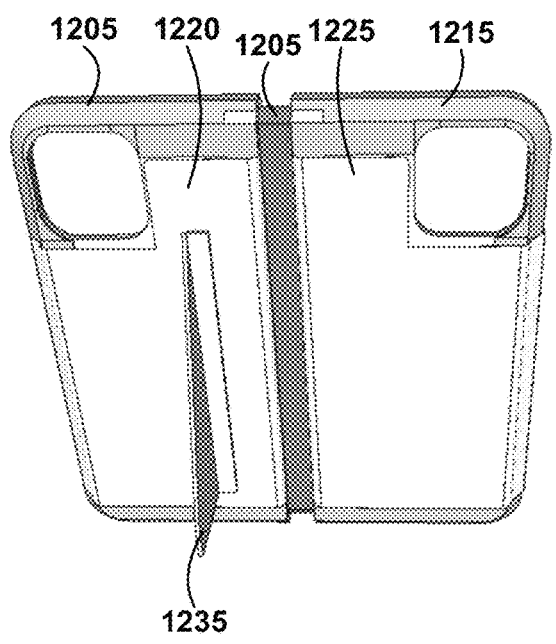
FIG. 12C shows for illustrative purposes only an example of a kickstand in an unfolded-position of one embodiment.

FIG. 12C shows for illustrative purposes only an example of a kickstand in an unfolded-position of one embodiment. FIG. 12C shows coupled kickstand in an unfolded position 1235 allowing the foldable phone 1205, hard outer shell 1220 coupled to the back side of the right side core foldable phone case 1205 and hard outer shell 1225 is coupled to the back side of the left side core foldable phone case 1215 to be supported in a hands-free viewing position of one embodiment.

Figure 12D:
FIG. 12D shows for illustrative purposes only an example of a foldable phone coupled to a two section core foldable phone case of one embodiment.

FIG. 12D shows for illustrative purposes only an example of a foldable phone coupled to a two section core foldable phone case of one embodiment. FIG. 12D shows a foldable phone 1240 coupled to a two section core foldable phone case including the left side core foldable phone case 1200 and a right side core foldable phone case 1210. The foldable phone 1240 shows the foldable screen 1245. The foldable phone 1240 is secure in the two section core foldable phone case as it folds and unfolds of one embodiment.

Figure 13A:
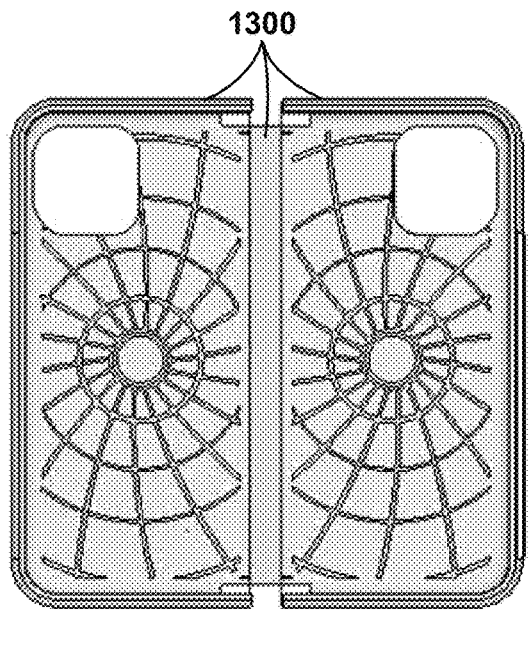
FIG. 13A shows for illustrative purposes only an example of a foldable phone coupled to a one section core foldable phone case of one embodiment.

Foldable Phone Coupled to a One Section Core Case:

FIG. 13A shows for illustrative purposes only an example of a foldable phone coupled to a one section core foldable phone case of one embodiment. FIG. 13A shows a one section core foldable phone case 1300 with a left side core foldable phone case and a right side core foldable phone case and a connection of the two sections forming the one section core foldable phone case 1300 of one embodiment.

Figure 13B:
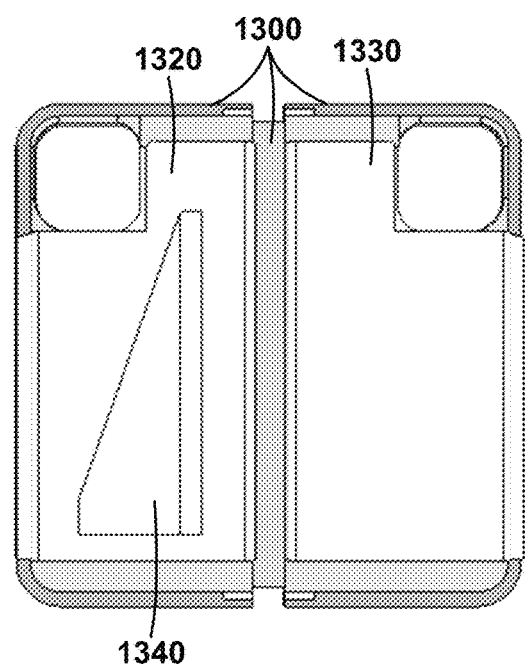
FIG. 13B shows for illustrative purposes only an example of a one section core foldable phone case two hard outer shells of one embodiment.

FIG. 13B shows for illustrative purposes only an example of a one section core foldable phone case two hard outer shells of one embodiment. FIG. 13B shows a first hard outer shell 1320 coupled to the back side of the one section core foldable phone case 1300 left side. A second hard outer shell 1330 is coupled to the back side of the one section core foldable phone case 1300 right side. The first hard outer shell 1320 includes a coupled kickstand in a folded-in position 1340 of one embodiment.

Figure 13C:
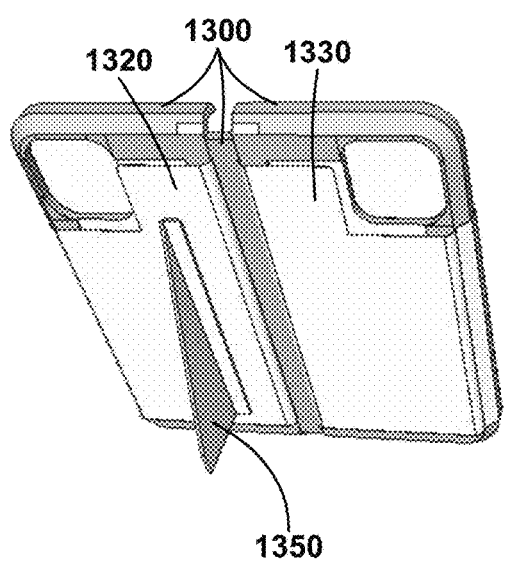
FIG. 13C shows for illustrative purposes only an example of a one section core foldable phone case kickstand in an unfolded position of one embodiment.

FIG. 13C shows for illustrative purposes only an example of a one section core foldable phone case kickstand in an unfolded position of one embodiment. FIG. 13C shows the first hard outer shell 1320 with the coupled kickstand in an unfolded position 1350 and the second hard outer shell 1330 allowing a foldable phone, hard outer shells and one section core foldable phone case 1300 to be supported in a hands-free viewing position of one embodiment.

Figure 13D:
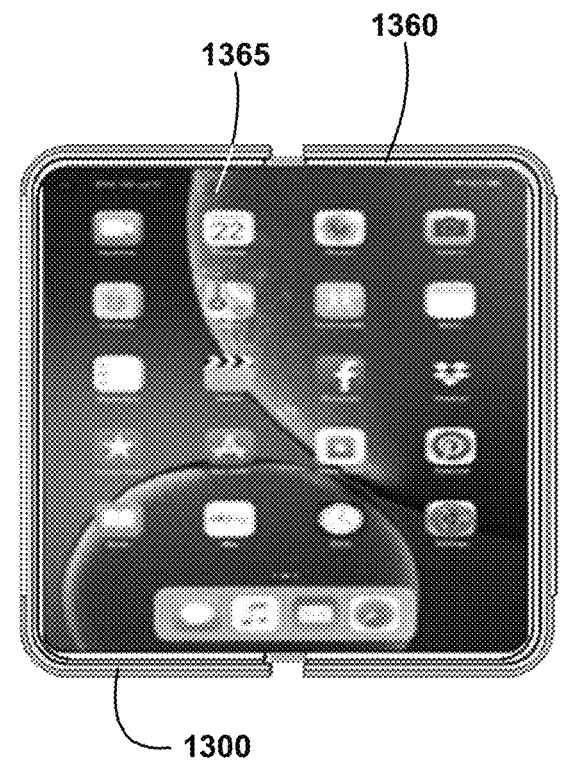
FIG. 13D shows for illustrative purposes only an example of a foldable phone coupled to a one section core foldable phone case of one embodiment.

FIG. 13D shows for illustrative purposes only an example of a foldable phone coupled to a one section core foldable phone case of one embodiment. FIG. 13D shows a foldable phone 1360 coupled to a one section core foldable phone case 1300. The foldable phone 1360 shows the foldable screen 1365. The foldable phone 1360 is secure in the one section core case as it folds and unfolds of one embodiment.

Two Section Clear Foldable Phone Case Back View:

FIG. 14A shows for illustrative purposes only an example of a two section clear foldable phone case back view of one embodiment. FIG. 14A shows a view of the back of a two section clear foldable phone case with a right side section clear foldable phone case 1400 and a left side section of clear foldable phone case 1410. The clear foldable phone case is manufactured with simultaneous injections of a flexible material from a group of rubber, silicone, and other composite material that may include clear materials into a front section of a mold and a hard material from a group of hard rigid material including hard rubber, tempered glass, carbon fiber, metal, glass, and composite materials that may include clear materials into a perimeter case structure of the mold forming a one piece clear foldable phone case. In another embodiment the flexible and hard rigid materials may include colored materials. In one embodiment the two section clear foldable phone case may include a screen protector from a group of materials including tempered glass and plastic. In another embodiment a screen protector may include a liquid glass application on the foldable phone screen.

FIG. 14B shows for illustrative purposes only an example of a two section clear foldable phone case front view of one embodiment. FIG. 14B shows a front view of the two section clear foldable phone case with a right side section clear foldable phone case 1430 and a left side section of clear foldable phone case 1420. From a front view a user would be looking at a front view of a foldable phone inserted into the two section clear foldable phone case of one embodiment.

FIG. 14C shows for illustrative purposes only an example of a two section clear foldable phone case coupled to a foldable phone of one embodiment. FIG. 14C shows the two section clear foldable phone case coupled to a foldable phone 1440 that has been inserted into the right side section clear foldable phone case 1400 and the left side section of clear foldable phone case 1410. The back flexible screen 1455 of the foldable phone 1440 is quite visible. The foldable phone 1440 is secure in the two section clear foldable phone case as it folds and unfolds of one embodiment.

FIG. 14D shows for illustrative purposes only an example of a two section clear foldable phone case coupled to a foldable phone of one embodiment. FIG. 14D shows the two section clear foldable phone case coupled to a foldable phone 1440 that has been inserted into the two section clear foldable phone case 1430 and the left side section of clear foldable phone case 1420. The front flexible screen 1465 of the foldable phone 1440 is quite visible. The foldable phone 1440 is secure in the two section clear foldable phone case as it folds and unfolds of one embodiment.

One Section Clear Foldable Phone Case Back View:

FIG. 15A shows for illustrative purposes only an example of a one section clear foldable phone case back view of one embodiment. FIG. 15A shows a one section clear foldable phone case back 1500 of a left side clear foldable phone case 1502 and a back view of a right side clear foldable phone case 1510 and a clear connection 1512 of the two sections forming the one section clear foldable phone case 1500 formed from groups of materials in a hybrid composition of a flexible clear material from a group of TPU, silicone, and other composite material into a front section of a mold and a hard clear material from a group of hard clear rigid material including TPU, tempered glass, carbon fiber, metal, glass, and composite materials into a perimeter case structure of the mold. The selections of flexible and hard rigid materials in another embodiment may include materials with a color of one embodiment.

FIG. 15B shows for illustrative purposes only an example of a one section clear foldable phone case front view of one embodiment. FIG. 15B shows the one section clear foldable phone case front view 1515. The clear connection 1512 coupled to the left side clear foldable phone case 1530 and the right side clear foldable phone case 1520 form the one section clear foldable phone case 1500 of FIG. 15A. The left and right sides of the clear foldable phone case include a clear front 1505 of one embodiment.

FIG. 15C shows for illustrative purposes only an example of a foldable phone coupled to a one section clear foldable phone case back view of one embodiment. FIG. 15C shows a back side of the foldable phone 1540 coupled to a one section clear foldable phone case back view 1550. The foldable phone 1540 shows the back foldable screen 1555 quite visibly on the left side 1530 and the right side clear foldable phone case 1520. The foldable phone 1540 is secure in the one section clear foldable phone case 1500 of FIG. 15A as it folds and unfolds using the clear connection 1512 of one embodiment.

FIG. 15D shows for illustrative purposes only an example of a foldable phone coupled to a one section clear foldable phone case front view of one embodiment. FIG. 15D shows a foldable phone 1540 coupled to a one section clear foldable phone case front view 1560. The foldable phone 1540 shows the front foldable screen 1565 quite visibly through the clear front 1505 of the left side clear foldable phone case 1530 and the right side clear foldable phone case 1520. The foldable phone 1540 is secure in the one section clear foldable phone case 1500 of FIG. 15A as it folds and unfolds using the clear connection 1512 of one embodiment.

Figure 16A:
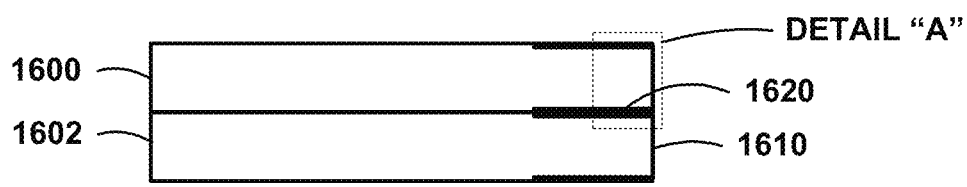
FIG. 16A shows for illustrative purposes only an example of a folded phone case with sliding connectors of one embodiment.

A Folded Case with Sliding Connectors:

FIG. 16A shows for illustrative purposes only an example of a folded phone case with sliding connectors of one embodiment. FIG. 16A shows a top folded phone case with an unanchored sliding connector 1600 and a bottom folded phone case with an unanchored of the sliding connector 1602. The two folded phone case sections are joined by a full length sliding connector 1610 and a shorter length sliding connector 1620. Detail "A" shows more detail of one embodiment.

Figure 16B:
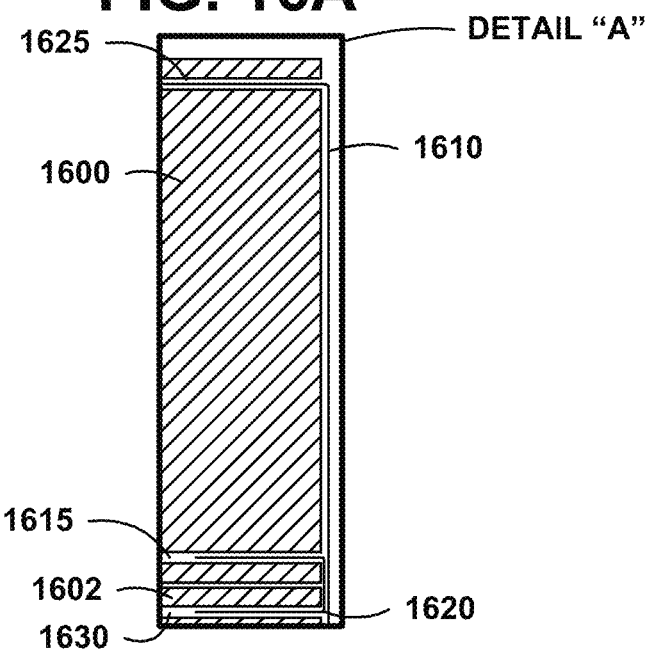
FIG. 16B shows for illustrative purposes only an example of a detail of a folded phone case with sliding connectors of one embodiment.

FIG. 16B shows for illustrative purposes only an example of a detail of a folded phone case with sliding connectors of one embodiment. FIG. 16B shows in Detail "A" a top folded phone case with an unanchored sliding connector 1600 and a bottom folded phone case with an unanchored of the sliding connector 1602. A full length sliding connector 1610 enters a sliding connector receiving slot for an unanchored sliding connector 1625. A shorter length sliding connector 1620 is received at both ends into a sliding connector receiving slot for an unanchored sliding connector 1615 and a sliding connector receiving slot for an unanchored sliding connector 1630 of one embodiment.

Figure 16C:
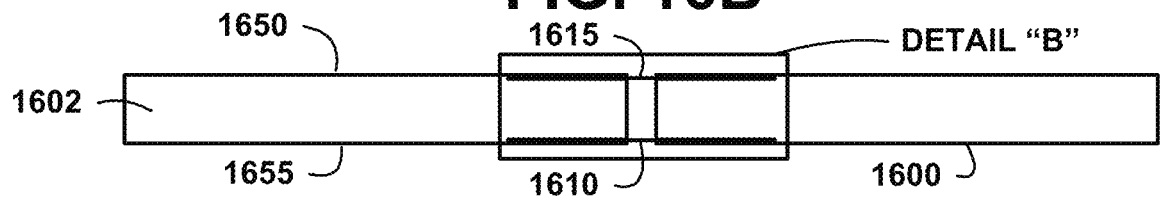
FIG. 16C shows for illustrative purposes only an example of an unfolded phone case with sliding connectors of one embodiment.

FIG. 16C shows for illustrative purposes only an example of an unfolded phone case with sliding connectors of one embodiment. FIG. 16C shows a top unfolded phone case with an unanchored sliding connector 1600 and a bottom unfolded phone case with an unanchored of the sliding connector 1602. A two screen sided phone is coupled in the foldable phone case. The exposed area of the top phone unfolded screen 1650 and on the opposite side the exposed area of the bottom phone unfolded screen 1655. A user will have a clear view of screen one 1660 and screen two 1665. A sliding connector receiving slot for an unanchored sliding connector 1615 receives a sliding connector 1610 when folded. Detail "B" shows more detail of one embodiment.

Figure 16D:
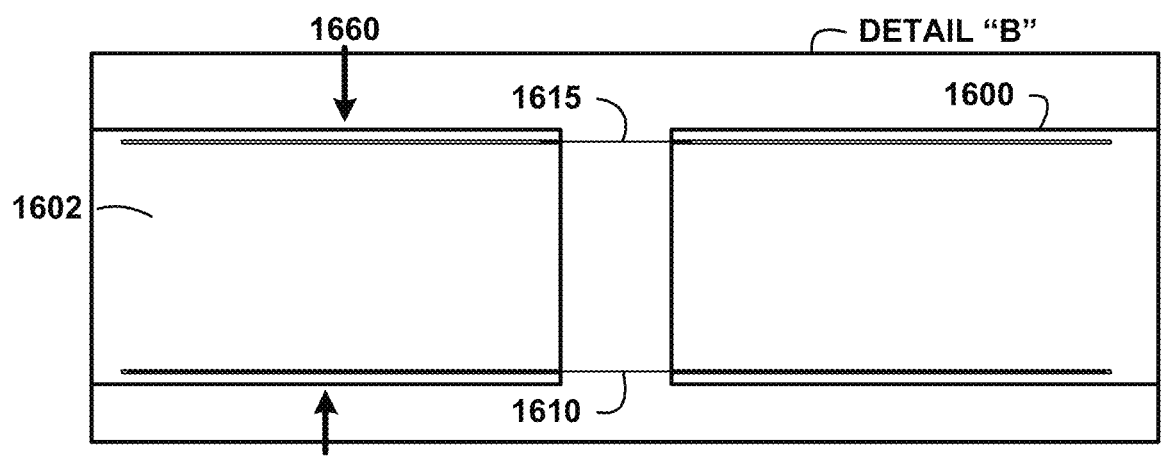
FIG. 16D shows for illustrative purposes only an example of a detail of an unfolded phone case with sliding connectors of one embodiment.

FIG. 16D shows for illustrative purposes only an example of a detail of an unfolded phone case with sliding connectors of one embodiment. FIG. 16D shows Detail "B" providing a close up of the connections. The top unfolded phone case with an unanchored sliding connector 1600 and the bottom unfolded phone case with an unanchored sliding connector 1602. A sliding connector receiving slot for an unanchored sliding connector 1615 accepts a section of the full length sliding connector 1610. A user will have a clear view of screen one 1660 and screen two 1665 of one embodiment.

Figure 17A:
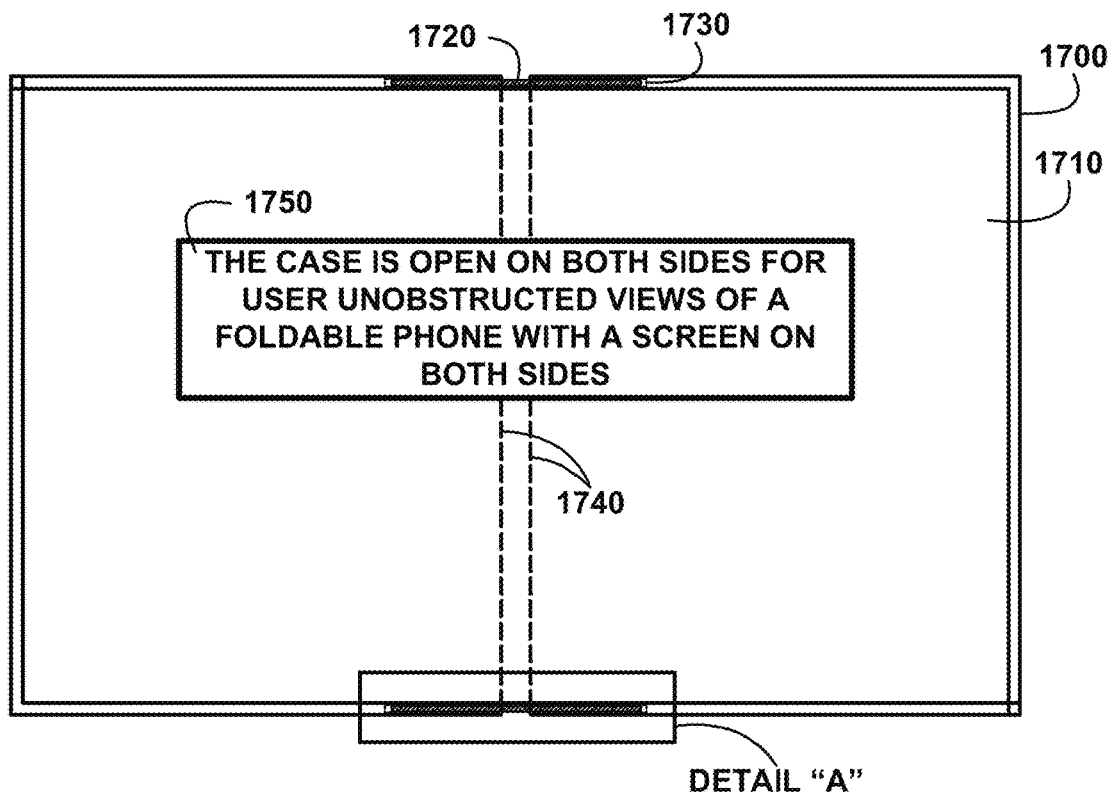
FIG. 17A shows for illustrative purposes only an example of a sliding band connector unfolded of one embodiment.

A Sliding Band Connector Unfolded:

FIG. 17A shows for illustrative purposes only an example of a sliding band connector unfolded of one embodiment. FIG. 17A shows an unfolded phone case 1700 with a two sided screen foldable phone coupled to the unfolded phone case 1710. The dashed lines indicate below both continuous screens the gap in the foldable phone wherein on both sides the screen spans the gap 1740. A band connector that slides in an out as the foldable phone case is folded and unfolded 1720 in a receiving slot wherein the band slides in and out 1730 to allow folding and unfolding of the foldable phone case. The band connectors are positioned in the sides of the foldable phone case so the foldable phone case has unobstructed views of a foldable phone with a screen on both sides 1750. Detail "A" indicates an area of the band for a clear illustration of one embodiment.

Figure 17B:
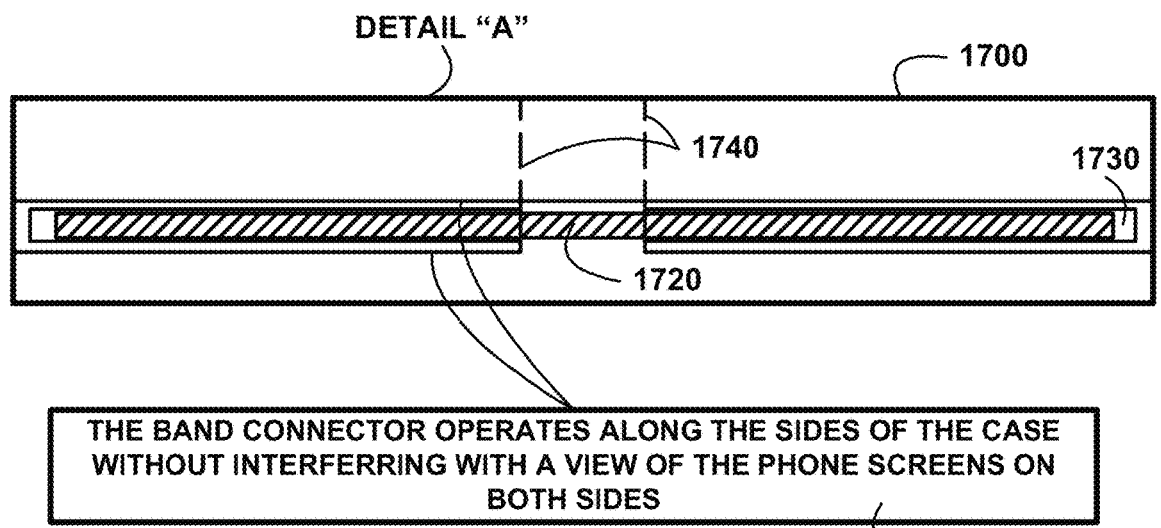
FIG. 17B shows for illustrative purposes only an example of a detail of a sliding band connector unfolded of one embodiment.

FIG. 17B shows for illustrative purposes only an example of a detail of a sliding band connector unfolded of one embodiment. FIG. 17B shows Detail "A" indicates an area of the band of an unfolded phone case 1700. The band spans the gap in the foldable phone wherein on both sides the screen spans the gap 1740. The band connector slides in and out as the foldable phone case is folded and unfolded 1720. Also showing is the receiving slot wherein the band slides in and out 1730 of one embodiment.

A Folded Anchored Case Sliding Connector:

FIG. 18A shows for illustrative purposes only an example of a folded anchored foldable phone case sliding connector of one embodiment. FIG. 18A shows a top folded case with an anchored sliding connector 1800 and a bottom folded case with an anchor of the sliding connector 1802. FIG. 18A shows also a bottom sliding connector 1810. A sliding connector receiving slot 1825 is configured for receiving a top sliding connector 1820 held in place by a bottom sliding connector anchor 1830. A detail area "A" 1890 shows a close-up of the top sliding connector 1820 held in place by a bottom sliding connector anchor 1830 of one embodiment.

FIG. 18B shows for illustrative purposes only an example of a detail of a folded anchored foldable phone case sliding connector of one embodiment. FIG. 18B shows a top folded case with an anchored sliding connector 1800 and a bottom folded case with an anchor of the sliding connector 1802. A top sliding connector 1820 is held in place using a top sliding connector anchor 1835 as the top sliding connector 1820 slides in or out of a sliding connector receiving slot 1825 of one embodiment.

FIG. 18C shows for illustrative purposes only an example of a detail of an unfolded anchored foldable phone case sliding connector of one embodiment. FIG. 18C shows a top folded case with an anchored sliding connector 1800 and a bottom folded case with an anchor of the sliding connector 1802. The top sliding connector 1820 slides into a sliding connector receiving slot 1825 when being folded. The sliding connector is secured in place using a top sliding connector anchor 1835. The bottom sliding connector 1810 is held in place using a bottom sliding connector anchor 1830 as the bottom sliding connector 1810 slides into a sliding connector receiving slot 1825.

In one embodiment the anchored case sliding connector is positioned along the outer edge of the case that allows a user to have an unobstructed view of one side of a foldable phone screen 1840 and an unobstructed view of the opposite side with a second foldable phone screen 1845.

A Folded Case with a Shutter Connector:

FIG. 19A shows for illustrative purposes only an example of a folded foldable phone case with a shutter connector of one embodiment. FIG. 19A shows a top folded phone case 1900 with a folded shutter connector 1910 and an anchored sliding connector 1920 connected in a folded orientation with a bottom folded phone case 1902. The folded shutter connector 1910 appears flat and close to the foldable phone case bodies of one embodiment.

FIG. 19B shows for illustrative purposes only an example of a detail of an unfolded foldable phone case with a shutter connector of one embodiment. FIG. 19B shows a close-up 1914 of the top unfolded phone case 1900 and the bottom unfolded phone case 1902 in a folded position connected using an anchored sliding connector 1920 and an unfolded shutter connector 1910. In one embodiment the shutter connector is positioned along the outer edge of the case that allows a user to have an unobstructed view of one side of a foldable phone screen 1912 and an unobstructed view of the opposite side with a second foldable phone screen 1912. DETAIL "A" shows a close-up of the unfolded shutter connector 1910 of one embodiment.

FIG. 19C shows for illustrative purposes only an example of an unfolded shutter connector of one embodiment. FIG. 19C shows DETAIL "A" of an unfolded shutter connector 1910 anchored at the top unfolded phone case 1900 and at the bottom unfolded phone case 1902. A close-up illustration of the shutter connection unfolded is shown in DETAIL "B" of one embodiment.

FIG. 19D shows for illustrative purposes only an example of a detail of an unfolded shutter connector of one embodiment. FIG. 19D shows Detail "B" including the top unfolded phone case 1900 and a shutter connector anchor 1970. A long shutter panel 1950 connects a shorter shutter panel unfolded 1960 with two flexible attachments that allows the shorter shutter panel unfolded 1960 to rotate in a shallow angle in a folded position. The series of shorter shutter panel reinforces the long shutter panel 1950 leaving a supported structure that does not bend or bulge down of one embodiment.

Figure 20:
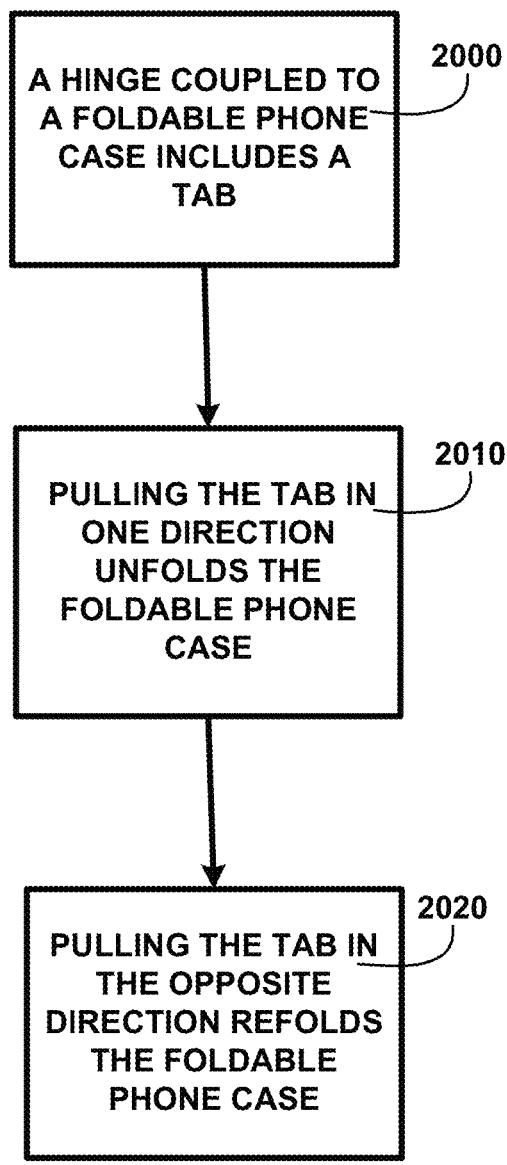
FIG. 20 shows for illustrative purposes only an example of a tab activated folding hinge of one embodiment.

A Tab Activated Folding Hinge:

FIG. 20 shows for illustrative purposes only an example of a tab activated folding hinge of one embodiment. FIG. 20 shows a hinge coupled to a foldable phone case includes a tab 2000. Pulling the tab in one direction unfolds the foldable phone case 2010. Pulling the tab in the opposite direction refolds the foldable phone case 2020 of one embodiment.

A Hard Material Foldable Phone Case:

FIG. 21A shows for illustrative purposes only an example of a hard material foldable phone case of one embodiment. FIG. 21A shows an illustrative portion of a first hard material outer section 2100 and a second hard material insert 2110. The first hard material outer section 2100 is made of a first hard material. The second hard material insert 2110 is made of a second hard material. The two hard materials may be selected from a group of hard rigid materials including polycarbonate (PC), carbon fiber, metal, glass, and composite materials of one embodiment.

FIG. 21B shows for illustrative purposes only an example of inserting a second hard material insert of one embodiment. FIG. 21B shows sliding 2120 the second hard material insert 2110 into the first hard material outer section 2100 of one embodiment.

FIG. 21C shows for illustrative purposes only an example of a two sided screen foldable phone hard material foldable phone case of one embodiment. FIG. 21C shows a two sided screen foldable phone hard material foldable phone case 2125 created from the first hard material outer section 2100 and the inserted second hard material insert 2110 of one embodiment.

FIG. 21D shows for illustrative purposes only an example of an inserted layered hard material foldable phone case of one embodiment. FIG. 21D shows an inserted 2130 layered hard material foldable phone case formed with the first hard material outer section 2100 and the inserted second hard material insert 2110 of one embodiment.

FIG. 21E shows for illustrative purposes only an example of an inserted layered hard material foldable phone case of one embodiment. FIG. 21E shows a two-section hard material foldable phone case 2140 with a foldable gap 2145 between the two sections with an inserted 2130 layered hard material element in each of one embodiment.

FIG. 21F shows for illustrative purposes only an example of a one piece hard material foldable phone case of one embodiment. FIG. 21F shows a one piece hard material foldable phone case 2150 joined with a flexible connector 2160 of one embodiment. In another embodiment a soft material can be inserted inside the hard material and the length of this material may or may not completely fit inside the outer hard material.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A method, comprising:
   molding at least two foldable phone case body sections and a body sections joining foldable connector using simultaneous injections of a flexible material;
   molding one foldable phone case body section using a clear hybrid flexible material and molding another foldable phone case body section using a hard rigid material and a body sections joining foldable connector using a clear hybrid flexible material in a simultaneous injection of the clear hybrid flexible material and hard rigid materials into a mold;
   providing a foldable phone case with sliding foldable connectors configured to include a full length sliding connector and a shorter length sliding connector that slide into and out of a sliding connector receiving slot when a foldable phone case is folded or unfolded and conform to a curvature needed to form a folded bend;
   providing a foldable phone case for coupling with a foldable phone;

wherein each body of the foldable phone is coupled to a corresponding body section of the foldable phone case; and providing a foldable phone case for protecting the foldable phone in a folded and unfolded condition.

2. The method of claim 1, further comprising using simultaneous injections of a flexible materials is selected from a group of opaque and clear Thermoplastic polyurethane (TPU), silicone, rubber and other material that bends and flexes.

3. The method of claim 1, further comprising using simultaneous injections of a hard rigid materials is selected from a group of polycarbonate (PC), carbon fiber, metal, glass, and composite materials for at least two foldable phone case body sections.

4. The method of claim 1, further comprising molding a foldable phone case in a hybrid form using both flexible materials and hard rigid materials.

5. The method of claim 1, further comprising molding at least two foldable phone case body sections coupled using a connector.

6. The method of claim 1, further comprising coupling a tab activated folding hinge to the at least two foldable protective phone case body sections and wherein pulling the tab in one direction is for unfolding the foldable protective phone case and wherein pulling the tab in the opposite direction is for refolding the foldable protective phone case.

7. The method of claim 1, further comprising providing a foldable phone case coupled to a front flexible plastic cover.

8. The method of claim 1, further comprising molding the at least two foldable phone case sections coupled using a flexible rubber connector made with a flexible material selected from a group of flexible materials with properties comprising elasticity, transparency, and resistance to oil, grease and abrasion.

9. The method of claim 8, further comprising a flexible rubber and metal back cover coupled to the flexible rubber foldable connector.

10. The method of claim 1, further comprising molding at least two foldable phone case body sections coupled for folding side to side.

11. An apparatus, comprising:
a flexible phone case with a first body section and a second body section for coupling to a foldable cell phone;
a flexible phone case first body section for coupling to a front section of the foldable cell phone and a second body section for coupling to a back section of the foldable cell phone, wherein the flexible phone case first body section and second body section do not inhibit the folding of the foldable cell phone;
a back cover coupled to a flexible rubber connector configured for coupling to the foldable cell phone;
a foldable phone case with sliding foldable connectors configured to include a full length sliding connector and a shorter length sliding connector that slide into and out of a sliding connector receiving slot when a foldable phone case is folded or unfolded and conform to a curvature needed to form a folded bend;
a front cover coupled to a flexible rubber connector configured for coupling to the foldable cell phone configured for protecting a foldable phone flexible screen; and
a back cover coupled to the flexible foldable phone case configured for protecting a foldable phone back surface.

12. The apparatus of claim 11, further comprising a flexible foldable phone case configured for coupling to a digital tablet.

13. The apparatus of claim 11, further comprising a flexible foldable phone case with shutter connectors.

14. The apparatus of claim 11, further comprising a front flexible plastic cover configured for protecting a foldable phone flexible screen.

15. The apparatus of claim 11, further comprising a flexible rubber foldable connector.

16. An apparatus, comprising:
a flexible rubber foldable connector;
a foldable phone case with a back cover and a flexible rubber connector configured for coupling to a foldable cell phone;
at least one hard outer layer configured for coupling to a foldable phone case;
a foldable phone case with sliding foldable connectors configured to include a full length sliding connector and a shorter length sliding connector that slide into and out of a sliding connector receiving slot when a foldable phone case is folded or unfolded and conform to a curvature needed to form a folded bend;
a foldout kickstand coupled to a foldable phone case allowing a foldable phone to be supported in a hands-free viewing position; and
a cover configured for protecting a foldable phone flexible screen.

17. The apparatus of claim 16, further comprising at least one hard outer layer configured with a hard outer shell.

18. The apparatus of claim 16, further comprising a foldable phone case with anchored sliding connectors.

19. The apparatus of claim 16, further comprising a cover configured for protecting a foldable phone flexible screen configured to flex and bend with the foldable phone flexible screen.

* * * * *